US007575515B2

(12) United States Patent
Rodgers et al.

(10) Patent No.: US 7,575,515 B2
(45) Date of Patent: Aug. 18, 2009

(54) GAMING DEVICE HAVING ACCUMULATION GAME WITH SELECTION OF TERMINATOR SYMBOLS

(75) Inventors: Paulina Rodgers, Reno, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 408 days.

(21) Appl. No.: 10/956,444

(22) Filed: Sep. 30, 2004

(65) Prior Publication Data

US 2006/0073871 A1 Apr. 6, 2006

(51) Int. Cl.
*A63F 13/00* (2006.01)

(52) U.S. Cl. ............................ 463/20; 463/16; 463/19; 463/21; 463/37

(58) Field of Classification Search .................. 463/16, 463/17, 18, 19, 20, 21, 25, 26, 27, 29, 30, 463/31, 32; 273/143 R, 142, 139
See application file for complete search history.

(56) References Cited

U.S. PATENT DOCUMENTS 4,508,513 A * 4/1985 Donovan .................... 434/346
4,624,459 A 11/1986 Kaufman
4,695,053 A 9/1987 Vazquez, Jr. et al.
4,837,728 A 6/1989 Barrie et al.
5,085,436 A 2/1992 Bennett
5,205,555 A * 4/1993 Hamano ................. 273/143 R
5,259,616 A * 11/1993 Bergmann ................... 463/17
5,292,127 A * 3/1994 Kelly et al. ............. 273/118 A
5,342,047 A 8/1994 Heidel et al.
5,344,144 A 9/1994 Canon
5,393,067 A 2/1995 Paulsen
5,401,024 A * 3/1995 Simunek ...................... 463/18
5,494,287 A 2/1996 Manz
5,564,700 A 10/1996 Celona
5,788,573 A * 8/1998 Baerlocher et al. ............ 463/16
5,823,874 A 10/1998 Adams
5,848,932 A 12/1998 Adams
5,882,261 A 3/1999 Adams
5,911,418 A 6/1999 Adams (Continued)

FOREIGN PATENT DOCUMENTS

EP 0874337 A1 10/1998

(Continued)

OTHER PUBLICATIONS

By George Advertisement written by IGT, gaming device shown in Oct. 2000, advertisement published in 2002.

(Continued)

*Primary Examiner*—John M Hotaling, II
*Assistant Examiner*—Sunit Pandya
(74) *Attorney, Agent, or Firm*—K&L Gates LLP

(57) ABSTRACT

A gaming device and method of operating a gaming device having a plurality of groups of elements. The gaming device indicates one of the elements. Terminators are distributed and associated with each of the elements of another one of the groups of elements. In one embodiment, an award is associated with each of the gaming elements. The gaming elements are indicated and the award associated with each indicated gaming element provided to the player until a gaming element associated with a terminator is indicated.

27 Claims, 25 Drawing Sheets

U.S. PATENT DOCUMENTS

| | | | | |
|---|---|---|---|---|
| 5,931,467 | A * | 8/1999 | Kamille | 273/139 |
| 5,941,772 | A | 8/1999 | Paige | |
| 5,951,397 | A | 9/1999 | Dickinson | |
| 5,980,384 | A | 11/1999 | Barrie | |
| 5,997,401 | A | 12/1999 | Crawford | |
| 6,012,982 | A | 1/2000 | Piechowiak et al. | |
| 6,015,346 | A | 1/2000 | Bennett | |
| 6,059,289 | A | 5/2000 | Vancura | |
| 6,089,976 | A | 7/2000 | Schneider et al. | |
| 6,089,978 | A | 7/2000 | Adams | |
| 6,102,798 | A * | 8/2000 | Bennett | 463/16 |
| 6,120,031 | A | 9/2000 | Adams | |
| 6,126,542 | A | 10/2000 | Fier | |
| 6,159,095 | A | 12/2000 | Frohm et al. | |
| 6,159,097 | A | 12/2000 | Gura | |
| 6,159,098 | A * | 12/2000 | Slomiany et al. | 463/25 |
| 6,162,121 | A * | 12/2000 | Morro et al. | 463/16 |
| 6,168,520 | B1 * | 1/2001 | Baerlocher et al. | 463/16 |
| 6,168,523 | B1 | 1/2001 | Piechowiak et al. | |
| 6,174,235 | B1 * | 1/2001 | Walker et al. | 463/25 |
| 6,179,710 | B1 | 1/2001 | Sawyer et al. | |
| 6,190,255 | B1 * | 2/2001 | Thomas et al. | 463/20 |
| 6,203,429 | B1 | 3/2001 | Demar et al. | |
| 6,210,279 | B1 | 4/2001 | Dickinson | |
| 6,224,483 | B1 | 5/2001 | Mayeroff | |
| 6,231,442 | B1 | 5/2001 | Mayeroff | |
| 6,237,913 | B1 * | 5/2001 | Kamille | 273/139 |
| 6,261,177 | B1 * | 7/2001 | Bennett | 463/16 |
| 6,309,300 | B1 * | 10/2001 | Glavich | 463/26 |
| 6,311,976 | B1 | 11/2001 | Yoseloff et al. | |
| 6,315,660 | B1 * | 11/2001 | DeMar et al. | 463/16 |
| 6,315,664 | B1 | 11/2001 | Baerlocher et al. | |
| 6,322,309 | B1 * | 11/2001 | Thomas et al. | 413/20 |
| 6,328,649 | B1 * | 12/2001 | Randall et al. | 463/20 |
| 6,347,996 | B1 * | 2/2002 | Gilmore et al. | 463/17 |
| 6,375,569 | B1 | 4/2002 | Acres | |
| 6,398,218 | B1 | 6/2002 | Vancura | |
| 6,406,369 | B1 | 6/2002 | Baerlocher et al. | |
| 6,413,161 | B1 | 7/2002 | Baerlocher et al. | |
| 6,413,162 | B1 | 7/2002 | Baerlocher et al. | |
| 6,416,409 | B1 | 7/2002 | Jordan | |
| 6,425,824 | B1 | 7/2002 | Baerlocher et al. | |
| 6,439,995 | B1 | 8/2002 | Hughs-Baird et al. | |
| 6,471,208 | B2 | 10/2002 | Yoseloff et al. | |
| 6,482,089 | B2 * | 11/2002 | DeMar et al. | 463/20 |
| 6,485,367 | B1 | 11/2002 | Joshi | |
| 6,506,117 | B2 * | 1/2003 | DeMar et al. | 463/20 |
| 6,506,118 | B1 | 1/2003 | Baerlocher et al. | |
| 6,508,707 | B2 * | 1/2003 | DeMar et al. | 463/16 |
| 6,511,375 | B1 | 1/2003 | Kaminkow | |
| 6,520,855 | B2 * | 2/2003 | DeMar et al. | 463/20 |
| 6,565,436 | B1 | 5/2003 | Baerlocher | |
| 6,572,471 | B1 * | 6/2003 | Bennett | 463/16 |
| 6,582,306 | B1 | 6/2003 | Kaminkow | |
| 6,582,307 | B2 * | 6/2003 | Webb | 463/22 |
| 6,585,591 | B1 * | 7/2003 | Baerlocher et al. | 463/25 |
| 6,595,854 | B2 | 7/2003 | Hughs-Baird et al. | |
| 6,602,136 | B1 | 8/2003 | Baerlocher et al. | |
| 6,602,137 | B2 * | 8/2003 | Kaminkow et al. | 463/16 |
| 6,607,437 | B2 | 8/2003 | Casey et al. | |
| 6,607,438 | B2 * | 8/2003 | Baerlocher et al. | 463/16 |
| 6,609,972 | B2 | 8/2003 | Seelig et al. | |
| 6,620,045 | B2 * | 9/2003 | Berman et al. | 463/25 |
| 6,632,139 | B1 * | 10/2003 | Baerlocher | 463/16 |
| 6,632,140 | B2 * | 10/2003 | Berman et al. | 463/18 |
| 6,632,141 | B2 * | 10/2003 | Webb et al. | 463/25 |
| 6,634,945 | B2 * | 10/2003 | Glavich et al. | 463/25 |
| 6,663,489 | B2 | 12/2003 | Baerlocher | |
| 6,669,559 | B1 * | 12/2003 | Baerlocher et al. | 463/16 |
| 6,676,516 | B2 * | 1/2004 | Baerlocher et al. | 463/25 |
| 6,682,420 | B2 * | 1/2004 | Webb et al. | 463/16 |
| 6,685,560 | B1 * | 2/2004 | Hughes | 463/16 |
| 6,688,977 | B1 * | 2/2004 | Baerlocher et al. | 463/25 |
| 6,719,630 | B1 * | 4/2004 | Seelig et al. | 463/16 |
| 6,719,632 | B2 | 4/2004 | Palmer et al. | |
| 6,726,565 | B2 | 4/2004 | Hughs-Baird | |
| 6,733,386 | B2 | 5/2004 | Cuddy et al. | |
| 6,733,389 | B2 * | 5/2004 | Webb et al. | 463/20 |
| 6,749,504 | B2 | 6/2004 | Hughs-Baird | |
| 6,758,747 | B2 * | 7/2004 | Baerlocher | 463/16 |
| 6,769,983 | B2 * | 8/2004 | Slomiany | 463/16 |
| 6,776,711 | B1 * | 8/2004 | Baerlocher | 463/16 |
| 6,780,107 | B2 * | 8/2004 | Baerlocher et al. | 463/16 |
| 6,783,457 | B2 * | 8/2004 | Hughs-Baird et al. | 463/20 |
| 6,786,819 | B2 * | 9/2004 | Baerlocher et al. | 463/20 |
| 6,796,899 | B2 | 9/2004 | Baerlocher | |
| 6,796,900 | B2 | 9/2004 | Baerlocher et al. | |
| 6,802,775 | B2 | 10/2004 | Baerlocher et al. | |
| 6,808,452 | B2 * | 10/2004 | Baerlocher et al. | 463/17 |
| 6,814,664 | B2 * | 11/2004 | Baerlocher et al. | 463/16 |
| 6,817,944 | B2 * | 11/2004 | Kaminkow et al. | 463/16 |
| 6,843,722 | B2 * | 1/2005 | Webb | 463/16 |
| 6,860,811 | B1 * | 3/2005 | Wilkins | 463/25 |
| 6,878,061 | B2 * | 4/2005 | Baerlocher et al. | 463/16 |
| 6,929,952 | B2 * | 8/2005 | Baerlocher | 436/16 |
| 6,981,917 | B2 * | 1/2006 | Webb et al. | 463/16 |
| 7,001,273 | B2 * | 2/2006 | Baerlocher | 463/20 |
| 7,001,274 | B2 | 2/2006 | Baerlocher et al. | |
| 7,011,581 | B2 * | 3/2006 | Cole et al. | 463/16 |
| 7,040,983 | B2 * | 5/2006 | Dolloff et al. | 463/16 |
| 7,040,984 | B2 * | 5/2006 | Mead | 463/16 |
| 7,066,814 | B2 * | 6/2006 | Glavich et al. | 463/20 |
| 7,094,148 | B2 * | 8/2006 | Baerlocher et al. | 463/20 |
| 7,121,942 | B2 * | 10/2006 | Baerlocher | 463/20 |
| 7,198,570 | B2 * | 4/2007 | Rodgers et al. | 463/20 |
| 7,309,281 | B2 | 12/2007 | Baerlocher et al. | |
| 7,309,282 | B2 | 12/2007 | Baerlocher et al. | |
| 2002/0045475 | A1 * | 4/2002 | Glavich et al. | 463/20 |
| 2002/0142822 | A1 * | 10/2002 | Baerlocher et al. | 463/16 |
| 2002/0165019 | A1 * | 11/2002 | Slomiany | 463/16 |
| 2002/0198042 | A1 * | 12/2002 | Webb et al. | 463/20 |
| 2003/0040355 | A1 * | 2/2003 | Baerlocher | 463/20 |
| 2003/0040360 | A1 * | 2/2003 | Kaminkow | 463/25 |
| 2003/0045344 | A1 * | 3/2003 | Webb et al. | 463/20 |
| 2003/0045348 | A1 * | 3/2003 | Palmer et al. | 463/25 |
| 2003/0064777 | A1 * | 4/2003 | Baerlocher et al. | 463/16 |
| 2003/0181233 | A1 * | 9/2003 | Baerlocher et al. | 463/16 |
| 2003/0199311 | A1 * | 10/2003 | Webb | 463/22 |
| 2004/0002372 | A1 * | 1/2004 | Rodgers et al. | 463/20 |
| 2004/0067790 | A1 * | 4/2004 | Peterson et al. | 463/20 |
| 2004/0072607 | A1 * | 4/2004 | Thomas et al. | 463/16 |
| 2004/0082374 | A1 * | 4/2004 | Maya et al. | 463/16 |
| 2004/0082376 | A1 * | 4/2004 | Baerlocher et al. | 463/16 |
| 2004/0121838 | A1 * | 6/2004 | Hughs-Baird et al. | 463/25 |
| 2004/0132527 | A1 * | 7/2004 | Berman et al. | 463/18 |
| 2004/0152507 | A1 * | 8/2004 | Baerlocher et al. | 463/16 |
| 2004/0185928 | A1 * | 9/2004 | Baerlocher et al. | 463/16 |
| 2004/0248639 | A1 * | 12/2004 | Slomiany | 463/16 |
| 2005/0037831 | A1 * | 2/2005 | Seelig et al. | 463/17 |
| 2005/0049036 | A1 * | 3/2005 | Mead | 463/25 |
| 2005/0054413 | A1 * | 3/2005 | Randall et al. | 463/16 |
| 2005/0054416 | A1 * | 3/2005 | Hostetler et al. | 463/16 |
| 2005/0054434 | A1 * | 3/2005 | Baerlocher et al. | 463/25 |
| 2005/0070353 | A1 * | 3/2005 | Webb et al. | 463/16 |
| 2006/0040721 | A1 * | 2/2006 | Cuddy et al. | 463/16 |
| 2006/0068882 | A1 * | 3/2006 | Baerlocher et al. | 463/20 |
| 2006/0073873 | A1 * | 4/2006 | Rodgers et al. | 463/20 |
| 2006/0084500 | A1 * | 4/2006 | Baerlocher et al. | 463/25 |

FOREIGN PATENT DOCUMENTS

| | | | |
|---|---|---|---|
| EP | 0945837 | A2 | 9/1999 |
| EP | 0984409 | A2 | 3/2000 |
| EP | 1 296 293 | A2 | 3/2003 |

| | | | |
|---|---|---|---|
| EP | 1 298 607 | A2 | 4/2003 |
| EP | 1 298 611 | A1 | 4/2003 |
| EP | 1 298 612 | A2 | 4/2003 |
| GB | 2 366 435 | A | 3/2002 |
| GB | 2 393 020 | A | 3/2004 |
| WO | WO 00/12186 | | 3/2000 |
| WO | WO 02/32524 | A1 | 4/2002 |
| WO | WO 02/078804 | A1 | 10/2002 |
| WO | WO 03/026759 | A1 | 4/2003 |
| WO | WO 03/026760 | A1 | 4/2003 |
| WO | WO 03/027797 | A2 | 4/2003 |

OTHER PUBLICATIONS

Cash Box Advertisement written by Anchor Games/IGT, published in 2000.

Fortune Cookie Brochure written by IGT, published in 2000.

Jackpot Party Brochure and Articles written by WMS Gaming, Inc., published in 1998.

Neon Nights Brochure written by IGT, published in 2000.

Neon Nights Article written by Strictly Slots, published in Dec. 2000.

Regis Cash Club Advertisement written by IGT, published in 2002.

Texas Teas Brochure written by IGT, published in 2000.

Top Dollar Brochure Written by IGT, published in 1998.

Video Wheel of Fortune Brochure written by IGT, published in 1999.

Wheel of Fortune Brochure written by IGT, published in 1998.

Winning Bid Brochure written by WMS Gaming, Inc., published prior to 2001.

* cited by examiner

GAMING DEVICE HAVING ACCUMULATION GAME WITH SELECTION OF TERMINATOR SYMBOLS

CROSS REFERENCE TO RELATED APPLICATIONS

This application relates to co-pending U.S. application Ser. No. 11/689,843, Matter No. 112300-3838, entitled "GAMING DEVICE HAVING A BONUS AWARD WHEEL WITH A TERMINATOR."

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates in general to a gaming device and a method of operating a gaming device, and, more particularly, to a gaming device and method of operating a gaming device having a game which includes distributing terminators to each of a plurality of game elements upon an occurrence of an event in the game, wherein subsequent selection or indication of one of the elements with a distributed terminator causes termination of the game.

Contemporary gaming devices such as slot machines include a primary or base games and may also include one or more secondary or bonus games. The primary game typically begins or is initiated upon a wager placed by a player. The primary games typically generates one or more symbols using a symbol generator. If the gaming device generates a predetermined combination of symbols, the player wins a value. In addition, if the player reaches a bonus triggering event in the primary game, the gaming device advances the player to a bonus game or round where the player can accumulate additional values. The traditional bonus triggering event occurs when the player reaches a predetermined combination of symbols on a plurality of reels.

Certain well known bonus games provide the player with an opportunity to win a bonus award by choosing one or more selections from a group of selections. One or more terminators are associated with the selections. The player picks from a group of selections until the player picks a terminator. When the player obtains a terminator, the game provides the player the awards associated with the selections picked prior to picking the terminator. Examples of selection games with terminators are disclosed in U.S. Pat. No. 6,190,255 and EP 0 945 837 A2.

There is a continuing need to develop new and interesting types of games that allow players to increase the level of player excitement and enjoyment.

SUMMARY OF THE INVENTION

The present invention relates to a gaming device including a game having a plurality of elements and a plurality of terminators distributed to certain of the plurality of elements in a game upon an occurrence of a designated event in the game.

In one embodiment, the game includes a plurality of groups. Each group includes a plurality of elements. An award is associated with each element. In one embodiment, the designated event in the game includes generating, selecting, picking or otherwise indicating an element in a group. After the designated event in the game occurs, a plurality of terminators are distributed to, or associated with, each of the elements in one of the other groups. The present invention contemplates various alternatives of this terminator distribution scheme where the elements in more than one other element group are associated with terminators. It should be appreciated that the present invention thus provides the distribution or association of terminators with a plurality of elements in a group based on a picked or generated element in one of the other groups.

One of the elements is subsequently indicated. If one of the distributed terminators is associated with the indicated element, the game ends. If one of the distributed terminators is not associated with the indicated element, the award associated with the indicated element is provided to the player. In one embodiment, an award remains or is associated with an element associated with a terminator. In this embodiment, if the element associated with a terminator is indicated, the gaming device provides the award to the player and ends the game.

In one embodiment, elements continue to be generated or picked until an element associated with a distributed terminator is indicated. The gaming machine provides the player with the awards associated with each indicated element which is not associated with a terminator. In one embodiment, if all of the elements associated with an award are indicated before an element associated with a terminator is indicated, the gaming machine provides the player an additional award.

In one embodiment, if a terminator is not associated with the indicated element, the player is enabled to pick one selection from a plurality of masked selections. In one embodiment, each selection is associated with a modifier. The modifier associated with the picked selection modifies the award associated with the indicated element. In one embodiment, upon a pick of a selection, that selection is eliminated from the set of selections from which the player can subsequently pick. In an alternative embodiment, the gaming machine enables the player to pick the selection before the element is indicated. The game repeats the cycle of indicating elements and picking selections until a terminator is associated with an indicated element or all of the selections are picked. In one embodiment, if all of the selections are picked before an element associated with a terminator is indicated, an additional award is provided to the player. It should thus be appreciated that any suitable award or outcome generating scheme can be provided in accordance with the present invention.

It is further contemplated by the present invention that, in one embodiment, the gaming device includes a display device such as a wheel. The display device includes a plurality of elements or sections. The section elements are divided into at least two groups of elements. After occurrence of a designated event in the game such as a first generation, selection, pick or indication of one of the sections, a plurality of terminators are associated with at least one of the sections of one of the groups of sections. In one embodiment, the terminators are associated with each of the elements or sections of at least one of the groups in which a section is not indicated. The display device is subsequently activated to indicate sections or elements until a section associated with a terminator is indicated. In one embodiment, an award associated with each indicated section is provided to the player until a terminator is associated with the indicated section.

In one alternative embodiment, the gaming device includes an offer and acceptance scheme which enables the player to determine whether to cause an additional element to be indicated after the terminators have been distributed to the elements of at least one group of elements. In such an embodiment, the player loses at least some of the awards accumulated from the awards associated with previously indicated elements if an element associated with a terminator is indicated.

Additional features and advantages of the present invention are described in, and will be apparent from, the following Detailed Description of the Invention and the figures.

DETAILED DESCRIPTION OF THE INVENTION

Gaming Device and Electronics

Figure 1A:
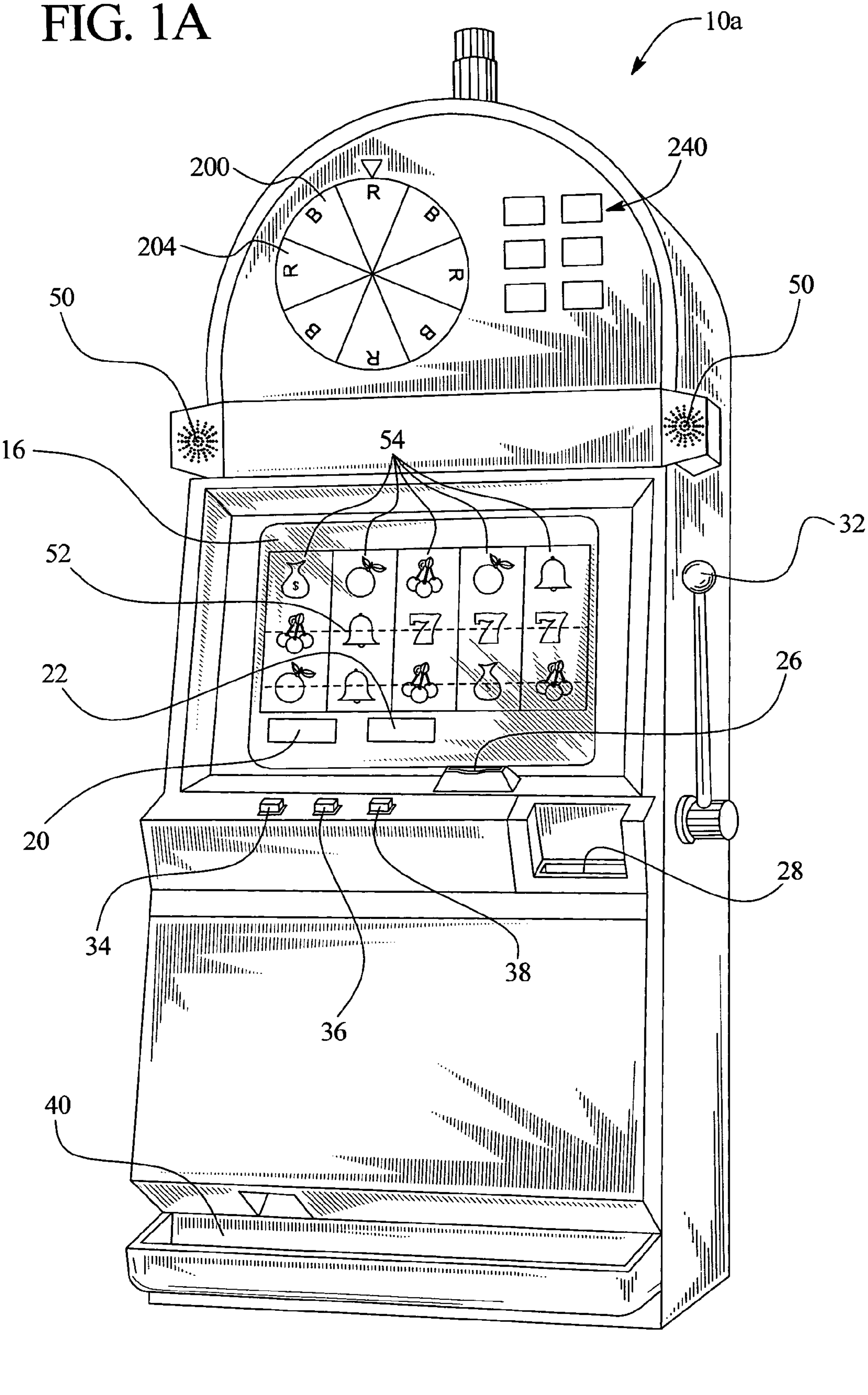
FIG. 1A is a front-side perspective view of one embodiment of the gaming device of the present invention.
Figure 1B:
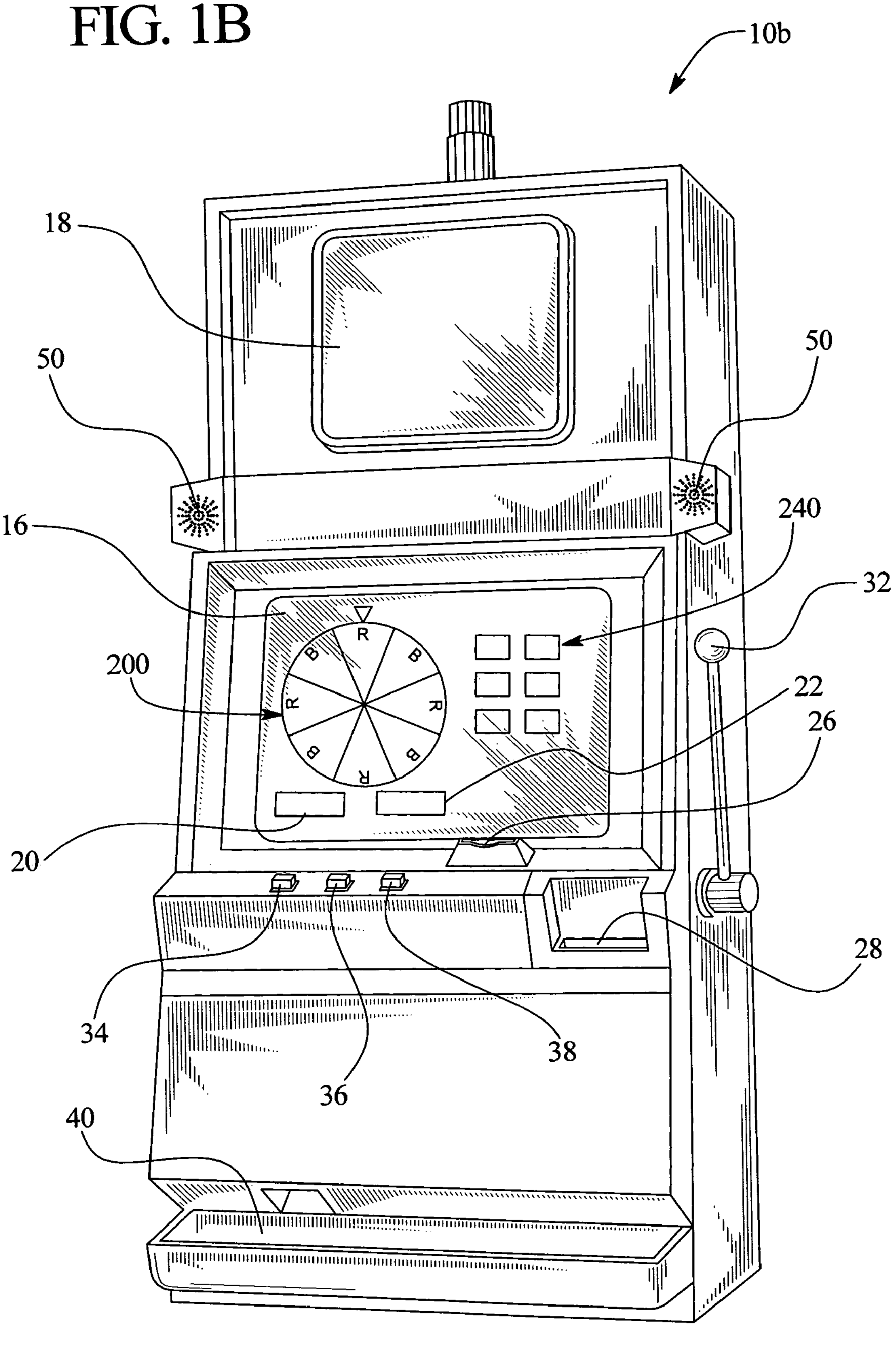
FIG. 1B is a front-side perspective view of another embodiment of the gaming device of the present invention.

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
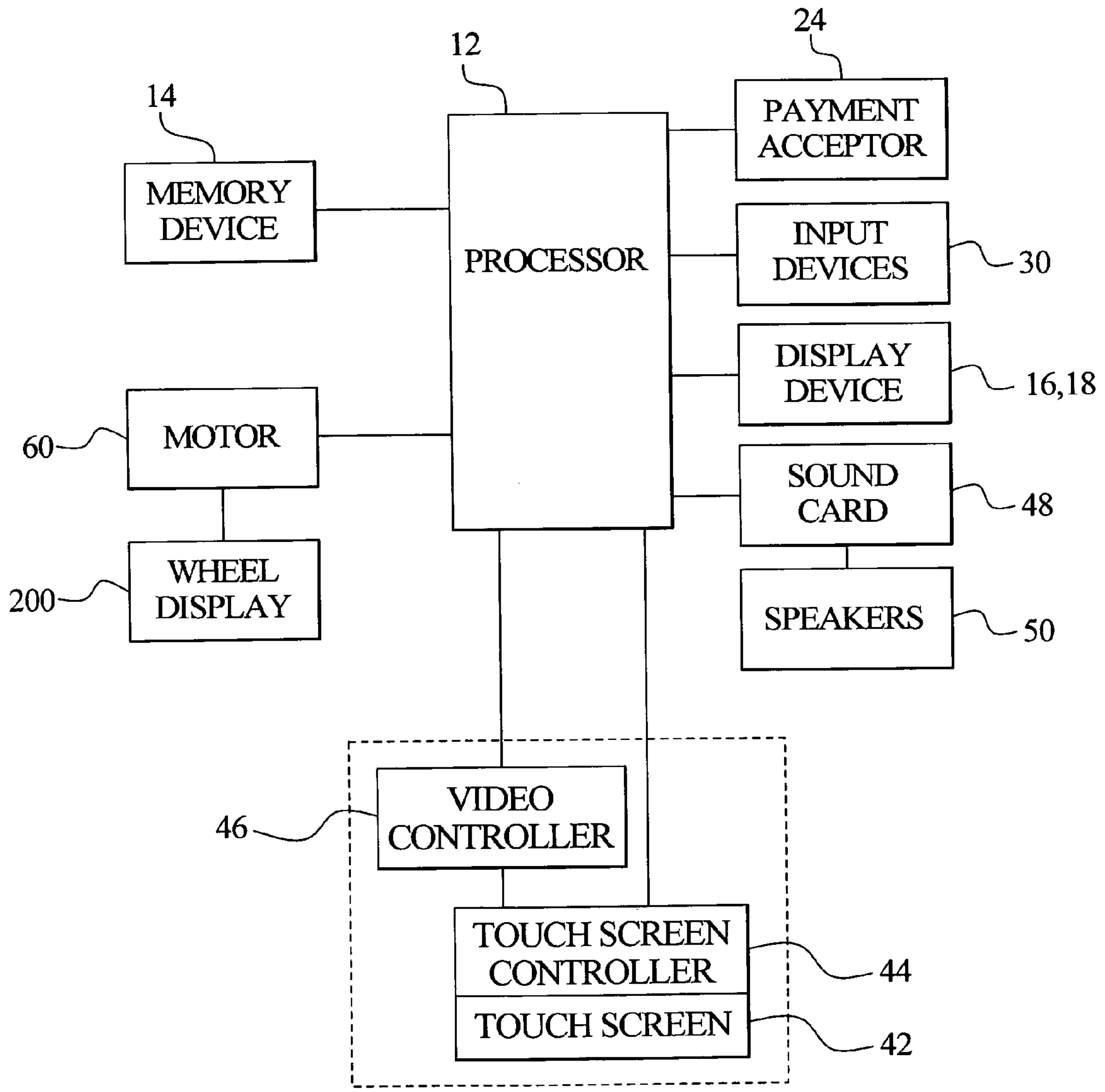
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with, or operable to access or to exchange signals with, at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or other operating data, information and applicable game rules that relate to the play of the gaming device. In another embodiment, the memory device includes random access memory (RAM). In one embodiment, the memory device includes read only memory (ROM). In a further embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. In this type of embodiment, the gaming device provides players with all of the available awards or other game outcomes over the course of the play cycle and guarantees a designated amount of actual wins and losses..

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered.

The display devices may include, without limitation, a monitor, a television display, a plasma display, a liquid crystal display (LCD), a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, a rectangle or an elongated rectangle.

The display devices of the gaming device are configured to display at least one and preferably a plurality of games or other suitable images, symbols and indicia such as any visual representation or exhibition of the movement of objects such as mechanical, virtual or video reels or symbol generators, such as wheels, dynamic lighting, video images and images of people, characters, places, things and faces of cards, tournament advertisements, promotions and the like.

In one embodiment, as illustrated in FIG. 1A, the gaming device includes at least one electromechanical symbol or element generator 200, such as a rotatable wheel, reels, dice, or any other suitable display device which is attached to the housing of the gaming device. In one embodiment, the symbol or element generator is arranged as illustrated in FIG. 1A. In one embodiment wherein the symbol or element generator is a rotatable wheel, the wheel includes a plurality of elements or sections 204 wherein each section displays a symbol representing an award or other outcome. As illustrated in FIG. 2A, the mechanical rotatable wheel 200 is associated with and connected to a suitable actuator or motor 60 which is controlled by the processor. The associated actuator or motor is adapted to drive or rotate the rotatable wheel in a clockwise or counter-clockwise direction.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards, data cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game associated with the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips which are redeemable by a cashier or funded to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. For example, in one embodiment, the display 16 and 18 includes a plurality of selectable elements 100 as illustrated in FIGS. 1A and 1B.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display device may-be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

The gaming device can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation of the game from a wager made by the player. That is, different primary wagering games, such as video poker games, video blackjack games, video keno, video bingo or any other suitable primary or base game may be implemented into the present invention.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device displays at least one reel and preferably a plurality of reels 54, such as three to five reels, in either electromechanical form with mechanical rotating reels or in video form with simulated reels and movement thereof. In one embodiment, an electromechanical slot machine includes a plurality of adjacent, rotatable wheels which may be combined and operably coupled with an electronic display of any suitable type. In another embodiment, if the reels are in video form, the plurality of simulated video reels are displayed on one or more of the display devices as described above. Each reel displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active pay line or otherwise occur in a winning combination or pattern.

In one embodiment, a base or primary game may be a poker game wherein the gaming device enables the player to play a conventional game of video poker and initially deals five cards, all face up, from a virtual deck of fifty-two cards. Cards may be dealt as in a traditional game of cards or in the case of the gaming device, the cards may be randomly selected from a predetermined number of cards. If the player wishes to draw, the player selects the cards to hold by using one or more input devices, such as pressing related hold buttons or touching a corresponding area on a touch-screen. After the player presses the deal button, the processor of the gaming device removes the unwanted or discarded cards from the display and deals replacement cards from the remaining cards in the deck. This results in a final five-card hand. The processor of the gaming device compares the final five-card hand to a payout table which utilizes conventional poker hand rankings to determine the winning hands. Award based on a winning hand and the credits wagered is provided to the player.

In another embodiment, the base or primary game may be a multi-hand version of video poker. In this embodiment, the player is dealt at least two hands of cards. In one such embodiment, the cards in all of the dealt hands are the same cards. In one embodiment each hand of cards is associated with its own deck of cards. The player chooses the cards to hold in a primary hand. The held cards in the primary hand are also held in the other hands of cards. The remaining non-held cards are removed from each displayed hand and replaced with randomly dealt cards. Since the replacement cards are randomly dealt independently for each hand, the replacement cards will usually be different for each hand. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferably a plurality of the selectable indicia or numbers by using an input devise or by using the touch-screen. The gaming device then displays a series of drawn numbers to determine an amount of matches, if any, between the player's selected numbers and the gaming device's drawn numbers. The player is provided an award, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a bonus prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program code which causes the processor to automatically begin a bonus round when the player has achieved a triggering event, a qualifying condition or other designated game event in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be triggered by exceeding a certain amount of game play (number of games, number of credits, amount of time), earning a specified number of points during game play or as a random award.

In one embodiment, once a player has qualified for a bonus game, the player may subsequently enhance their bonus game participation by returning to the base or primary game for continued play. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game. The player must win or earn entry through play of the primary game, thereby encouraging play of the primary game. In another embodiment, qualification of the bonus or secondary game could be accomplished through a simple "buy in" by the player if, for example, the player has been unsuccessful at qualifying for the bonus game through other specified activities.

Figure 2B:
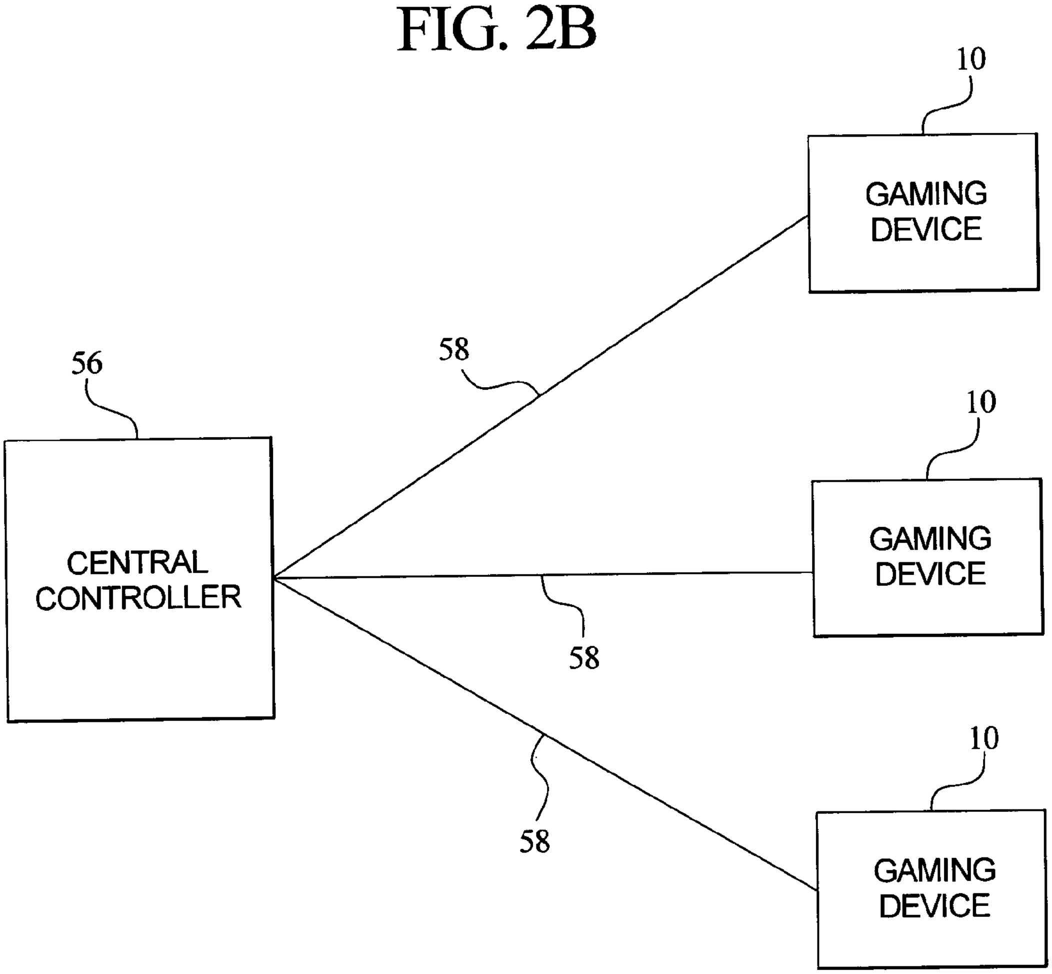
FIG. 2B is a schematic block diagram illustrating a plurality of gaming terminals in communication with a central controller.

In one embodiment, as illustrated in FIG. 2B, one or more of the gaming devices 10 of the present invention may be connected to a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and/or preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or an on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected to a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internetlintranet server or webserver) through a conventional phone or other data transmission line, digital signal line (DSL), T-1 line, coaxial cable, fiber optic cable, wireless gateway or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Terminator Distribution Embodiment

Figure 3A:
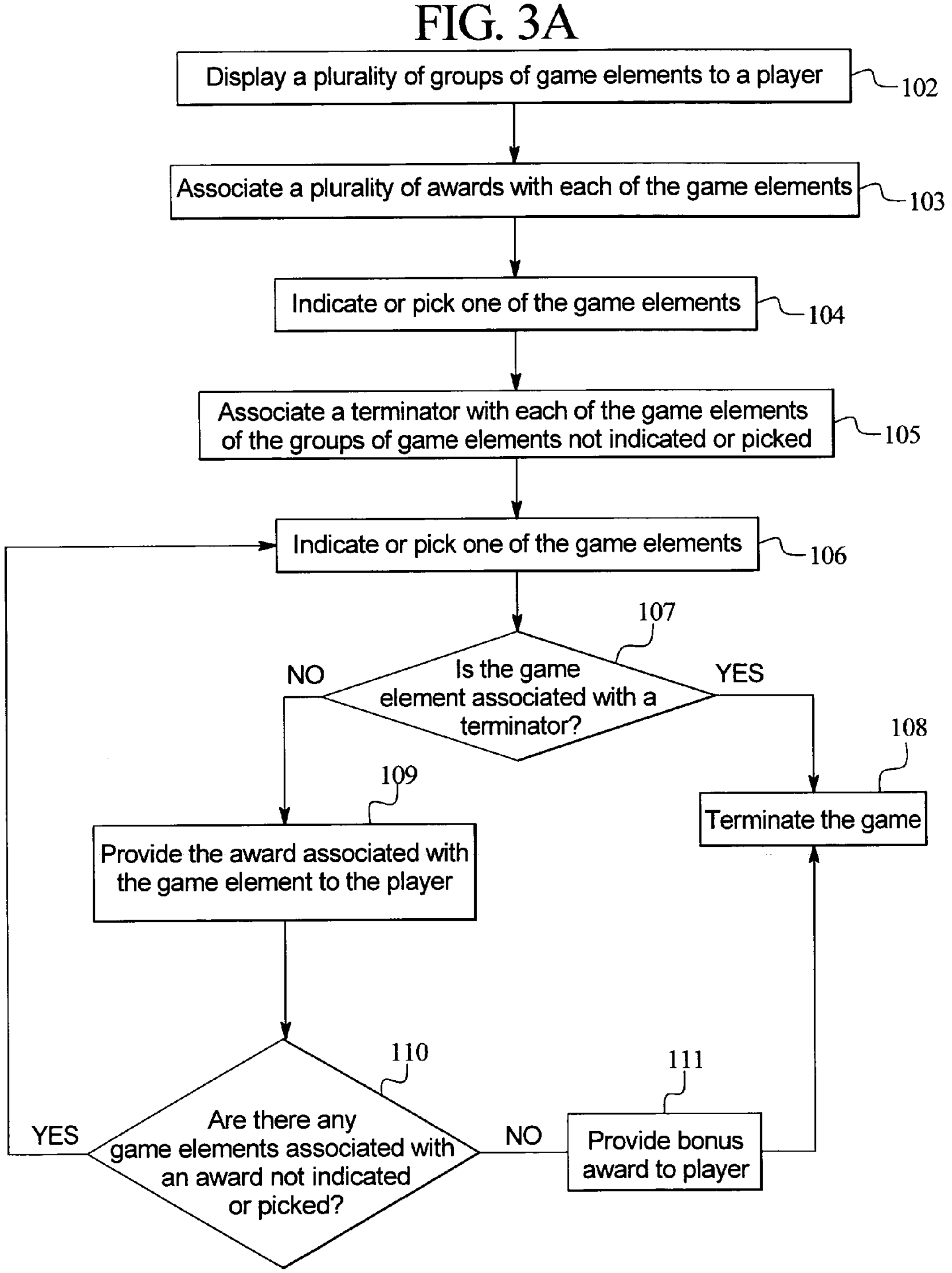
FIG. 3A is a flow diagram of one embodiment of the present invention.
Figure 3B:
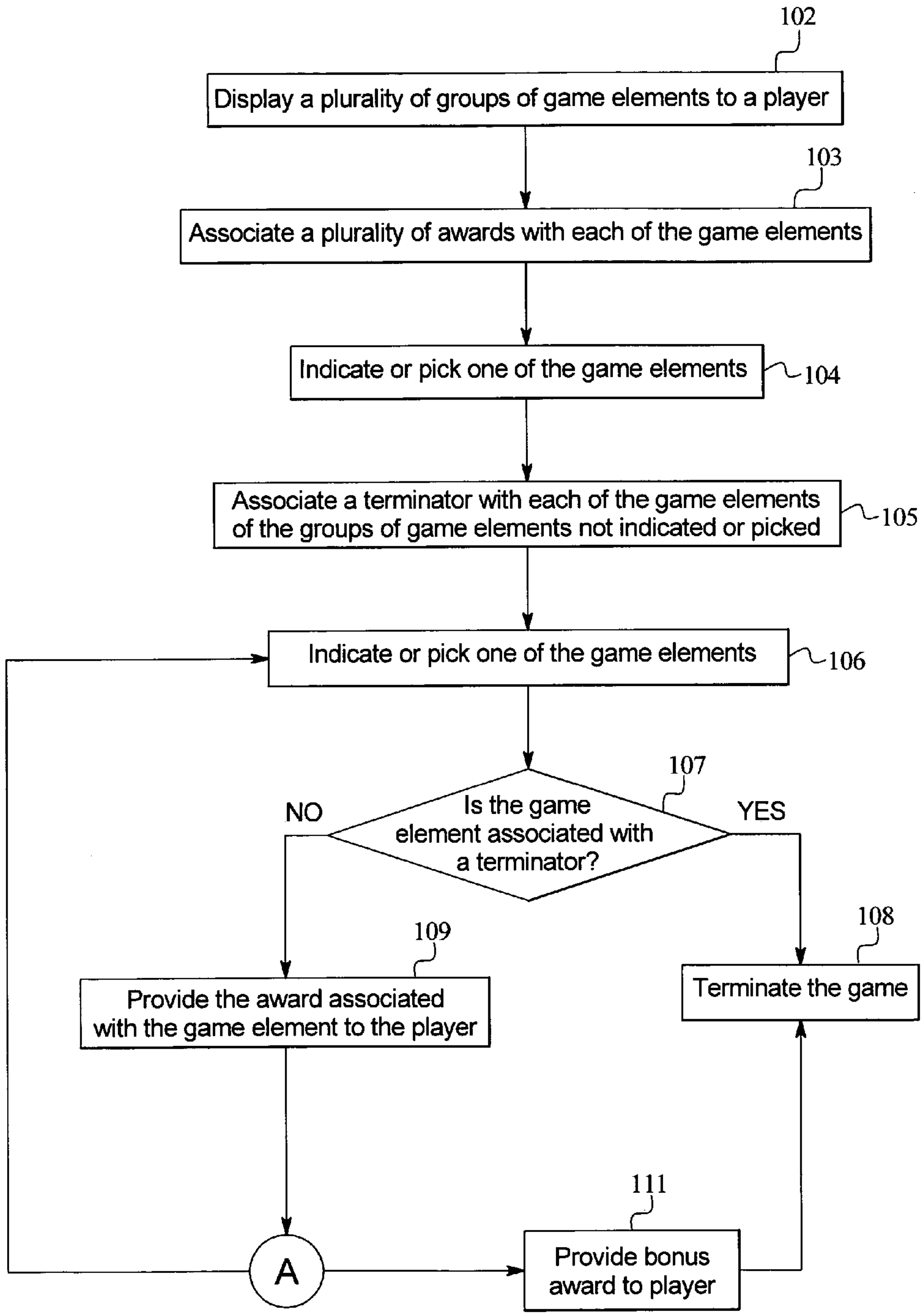
FIGS. 3B and 3C are flow diagrams of an alternative embodiment of the present invention.

FIGS. 3A and 3B illustrate flow diagrams of two alternative embodiments of the present invention. In FIG. 3A, the gaming device displays a plurality of groups of elements to a player as indicated by block 102. The gaming device associates a plurality of awards with each of the game elements as indicated by block 103. Alternately, the awards are pre-determined to be associated with the elements. One of the elements is then generated, indicated, or picked by the gaming device as indicated in block 104. In an alternative embodiment, the gaming device associates a plurality of awards with each of the game elements after one of the elements is generated, indicated or picked by the gaming device.

A terminator is associated with each of the elements in at least one group of elements not generated, indicated or picked as indicated by block 105. It should be appreciated that the elements can be generated, picked or indicated until a terminator is associated with each element of each group not generated, picked or indicated. If, for example, an element of a first group of elements is indicated, a terminator can be associated with each element of a randomly selected second different group of elements. If an element of the first group of elements or a third group of elements is subsequently indicated, a terminator can be associated with each element of a fourth group of elements, and so on until each group includes an indicated element or indicates terminators associated with each of its elements.

One of the elements is generated or indicated by the gaming device as indicated by block 106. The gaming device determines if the indicated or picked element is associated with a terminator as indicated by decision diamond 107. If the indicated or picked element is associated with a terminator, the game is terminated as indicated by block 108. Alternatively, the award associated with the indicated or picked element associated with the terminator is provided to the player, and the game is terminated. If the indicated or picked element is not associated with a terminator, the award associated with the indicated or picked element is provided to the player as indicated by block 109. It should be appreciated that these steps can occur in any suitable order in which the awards are associated with the elements after an element is indicated and/or after it is determined whether the indicated or picked element is associated with a terminator.

In one embodiment, the gaming device determines if any game elements associated with an award remain to be indicated or picked as indicated by decision diamond 110. In this embodiment, if elements associated with an award remain to be indicated or picked, the gaming device indicates or the player picks another game element as indicated by block 106. A repetitive loop including 106, 107, 109 and 110 continues until an element associated with a terminator is indicated or picked or no elements associated with an award remain to be indicated or picked. In one such embodiment, if no elements associated with an award remain to be indicated or picked, the gaming device provides the player an additional bonus award 111 for indicating or picking all of the elements associated with an award without indicating a game element associated with a terminator.

Alternatively, one or more elements are picked one or more times and the gaming device does not determine if any game elements associated with an award remain to be indicated or picked. Thus, the game continues until an element with an associated or distributed terminator is picked even though one or more elements are picked one or more times.

Figure 3C:
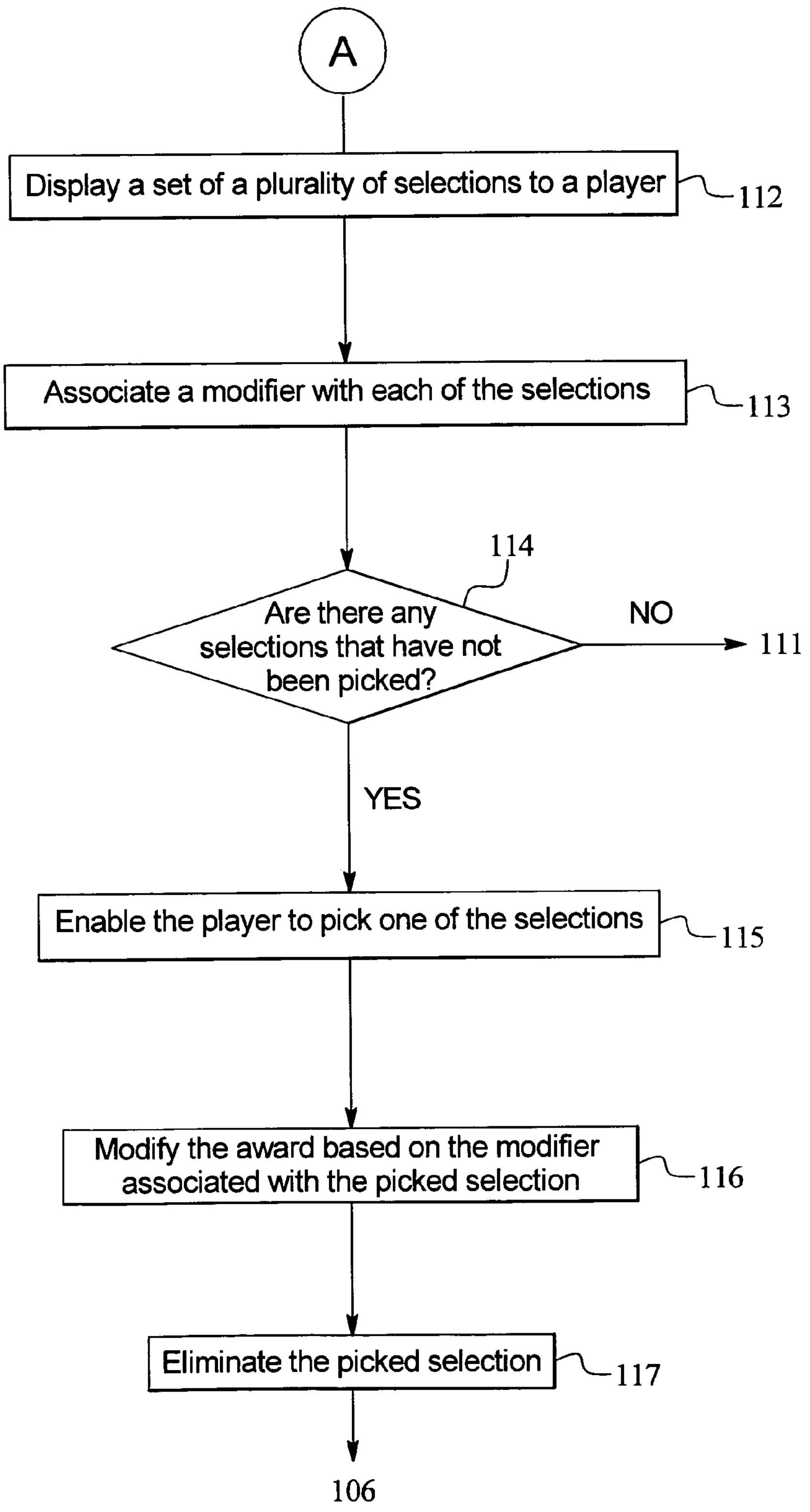

As illustrated in FIGS. 3B and 3C, an alternative embodiment indicated by the "A" symbol in FIG. 3B and further illustrated in FIG. 3C, includes a set of a plurality of selections displayed to the player as indicated by block 112. In one embodiment, an outcome such as a modifier is associated with each of the selections as indicated by block 113. If the gaming device indicates an element which is not associated with a distributed terminator, the gaming device determines if there are any selections that have not been picked by the player as indicated by decision diamond 114. In one such embodiment, if there are no selections remaining to be picked by the player, the gaming device provides the player a bonus award as indicated by block 111 for picking all of the selections before a game element associated with a terminator is indicated or picked. If there are selections remaining to be picked by the player, the gaming device enables the player to pick one of the selections as indicated by block 115. The award provided to the player as indicated in block 109 in FIG. 3A is modified based on the modifier associated with the picked selection as indicated by block 116. In one embodiment, the picked selection is eliminated as indicated by block 117. In one embodiment, the gaming machine returns to step 110 of FIG. 3A. Alternatively, the gaming machine returns to step 106 of FIG. 3B.

In an alternative embodiment, if the indicated or picked element is associated with a terminator, the award associated with the picked element is provided to the player and the player is enabled to pick any remaining selections. It should be appreciated that in such an embodiment, the award associated with the picked element can be modified by the modifier associated with the picked selection before the game is terminated.

Figure 4:
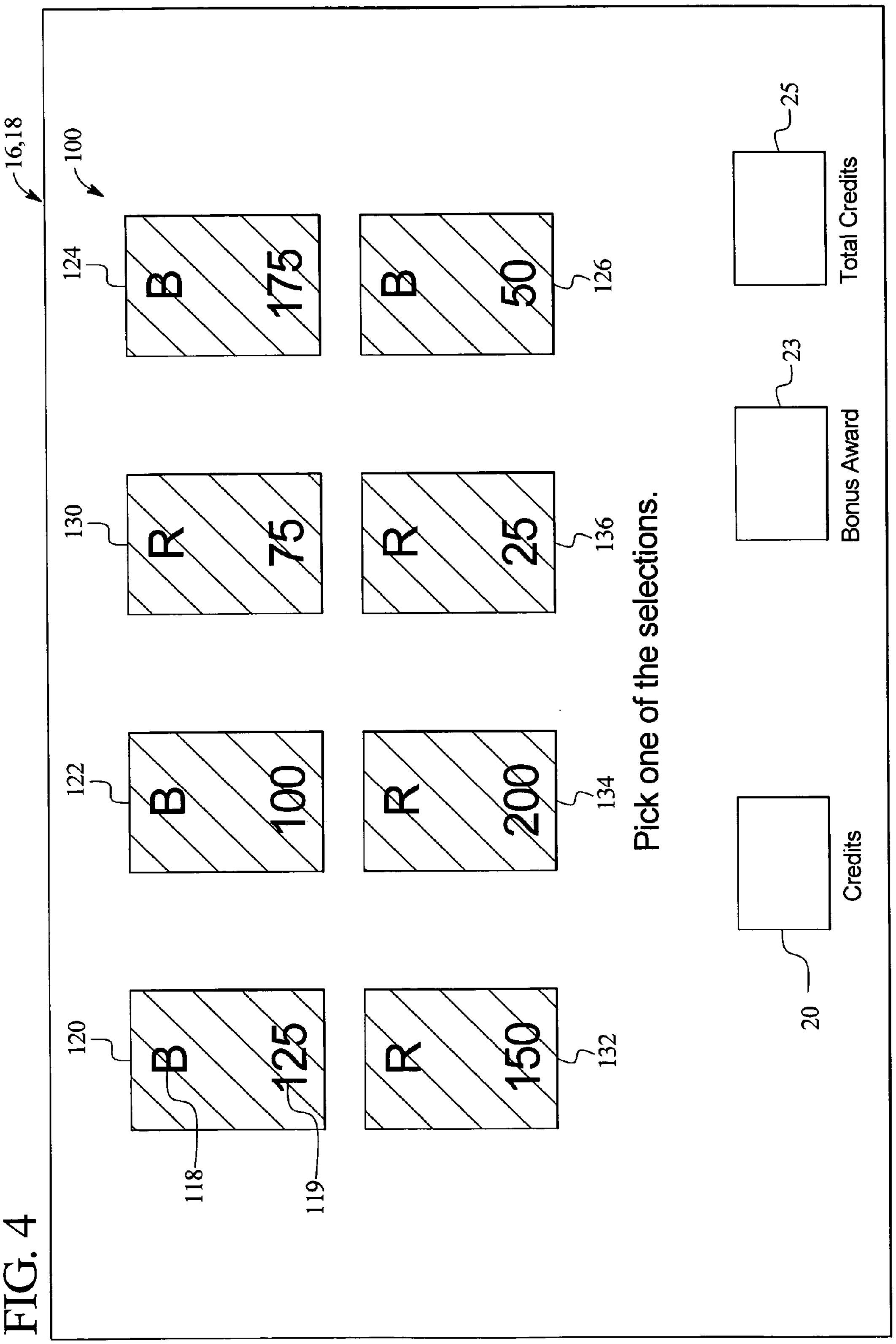
FIG. 4 is a front perspective view of a display device illustrating a selection game of one embodiment of the present invention.

Referring now to FIGS. 4 to 9, in one embodiment of the present invention, a primary or secondary game includes associating a terminator with each of a plurality of elements in at least one of a plurality of other groups of elements after an occurrence of an event in the game such as a pick of one of the groups. In one embodiment, a terminator is associated with each of a plurality of elements of a group of elements upon the occurrence of an event in a game. As illustrated in FIG. 4, in one embodiment of the present invention, two groups of elements 100 are simultaneously displayed to a player. The elements in the first group are indicated by the letter "B" and the elements in the second group are indicated by the letter "R". In the illustrated embodiment, each group of elements includes a plurality of element. In FIG. 4, two groups of four elements and thus or eight total elements are displayed to the player. Although the groups illustrated in FIG. 4 include the same number of elements in each group, it should be appreciated that at least one of the groups can include a different number of elements in that group. Furthermore, it should be appreciated that the game can include any suitable number of groups.

In one embodiment, the elements are masked to hide the group designation 118 of the element and the award 119 associated with each element. The "B" group of elements 120, 122, 124 and 126 are distinguished from an "R" group of selections 130, 132, 134 and 136 in the illustrated embodiment. It should be appreciated that any symbol, color, suit or other suitable visual or audio indicia can be used to distinguish each of the elements from the elements of another group of elements.

In one embodiment, an award 119 is associated with each element. In one embodiment, the expected average value of the awards associated with each group of elements is equal or substantially equal. For example, the awards associated with the selections in the B group, as illustrated in FIG. 4 include 50+100+125+175=450 credits and the expected average value of the award is 112.5 (assuming that the elements or sections are equally weighted). Likewise, the awards associated with the elements in the "R" group include 25+75+150+200=450 credits and the expected average values of the award is 112.5 (assuming that the elements or sections are equally weighted). It should be appreciated that, alternatively, the elements are not equally weighted, that the average expected values of the groups are not equally weighted, and that any suitable mathematical arrangement of the awards or other outcomes associated with the elements can be implemented in accordance with the present invention.

Figure 5:
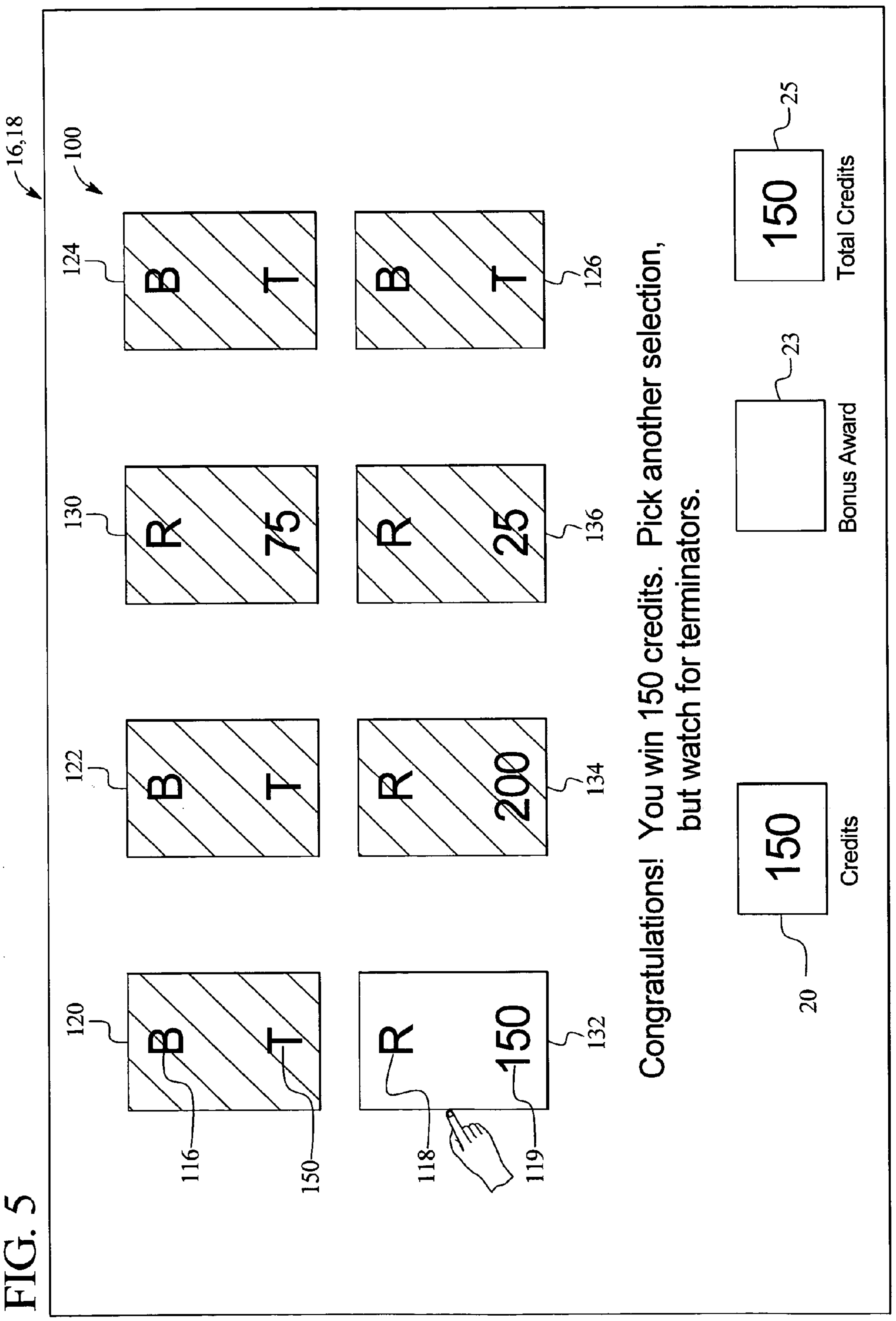
FIG. 5 is a front perspective view of a display device illustrating a selection game of one embodiment of the present invention.

In one embodiment, the gaming device enables the player to pick the elements. Alternatively, the gaming device picks the elements. In the embodiment illustrated in FIG. 4, the gaming device prompts and enables the player to pick one of the elements. In FIG. 5, the player picks element 132 which reveals to the player the "R" group designation 118 and the award value 119. The award value of one hundred fifty credits is provided to the player as indicated in the credits display 20 and the cumulative total number of credits display 25.

In the example of FIG. 5, the designated event initiating the distribution of terminators to the elements includes an initial pick of at least one displayed element. After this designated event, the gaming machine distributes or associates a terminator with at least one and preferably a plurality or all of the elements of another one of the group of elements which does not include the picked element. Hence, in the illustrated example, a terminator is associated with each of the elements of the "B" group of elements as indicated by the "T" symbols in FIG. 5. Specifically, a terminator 150 is associated with each of the elements 120, 122, 124 and 126 from the "B" or blue group of elements. In an alternative embodiment, a terminator can be associated with at least one, a plurality or all of the elements from the groups of elements from which an element is picked.

It should be appreciated that game outcome probability can be manipulated by how the terminators are distributed. In an embodiment wherein, each element group includes the same number of elements in each group, and the elements are eliminated after being picked, the probability of picking an element associated with a terminator is less than if a terminator is associated with the elements from the groups of elements not picked by the player. For example, in FIG. 5, a terminator is associated with each element of the group of elements not picked by the player, the "B" or blue group of elements; therefore, a terminator is associated with four of the remaining seven elements. The probability of picking an element associated with a terminator in this embodiment is four out of seven elements remaining, or 57%. In contrast, if a terminator is associated with each of the elements of the element group picked by the player, the terminator is associated with the three remaining elements of the "R" or red Group of elements. The probability of picking an element associated with a terminator in this embodiment is only three out of seven elements remaining, or 38%.

After the terminators are distributed in FIG. 5, the player is prompted to pick another element. In one embodiment, the player continues to pick elements from the displayed groups of elements and to be provided the awards associated with those picked elements until the player picks an element which has been associated with a terminator.

Figure 6:
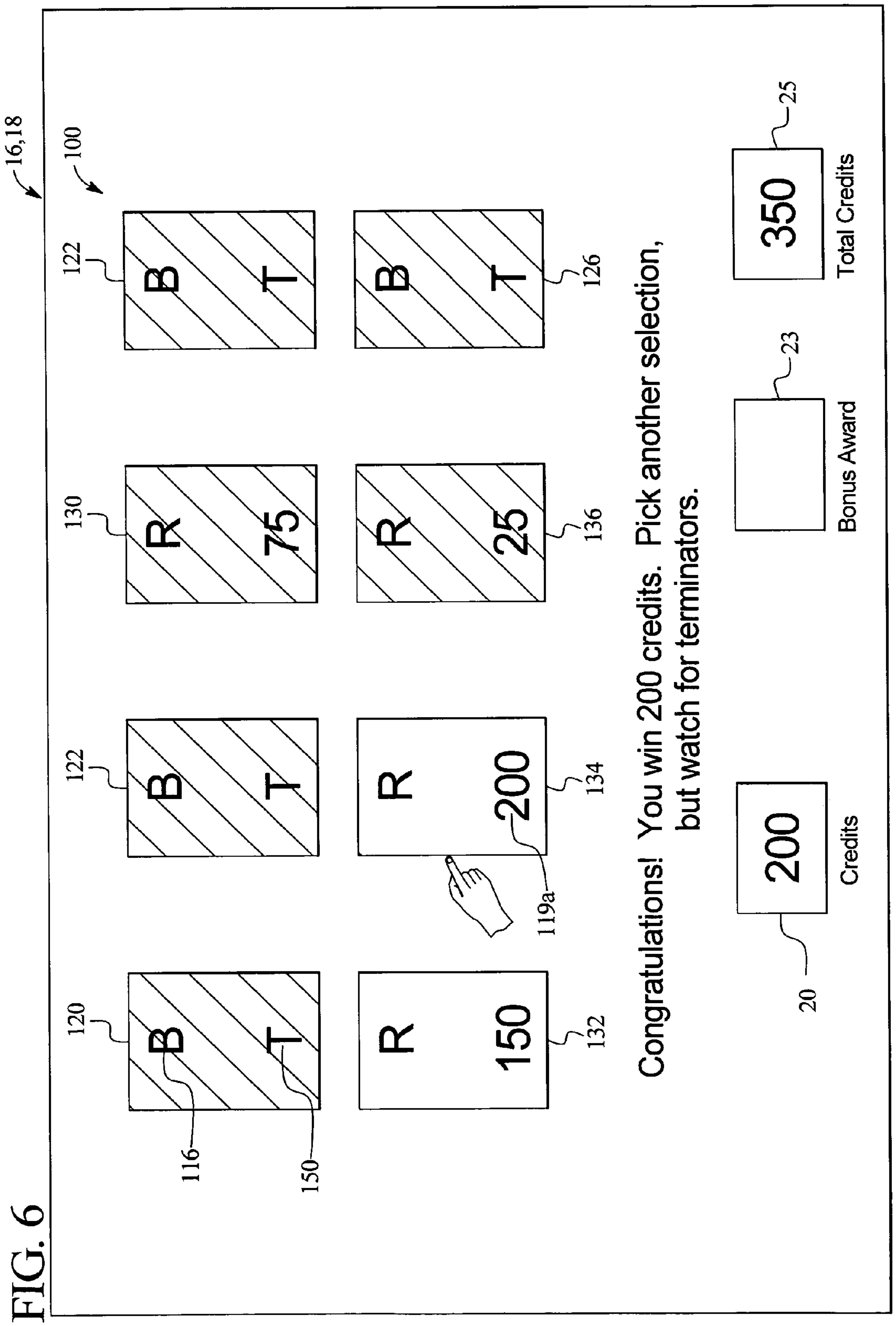
FIG. 6 is a front perspective view of a display device illustrating a selection game of one embodiment of the present invention.

Referring now to FIG. 6, the player picks another element 134 from the "R" group having an award 119*a* associated therewith. The award of two hundred credits is provided to the player as indicated by the credits display 20 and is added to the award provided to the player in the previous pick for a cumulative total award of three hundred fifty credits as indicated in the total credits display 25. Again, the player is prompted to pick another element. It should be appreciated that, in one embodiment, with each successful pick of an element that is not associated with a terminator, the probability of picking an element with a terminator increases.

Figure 7:
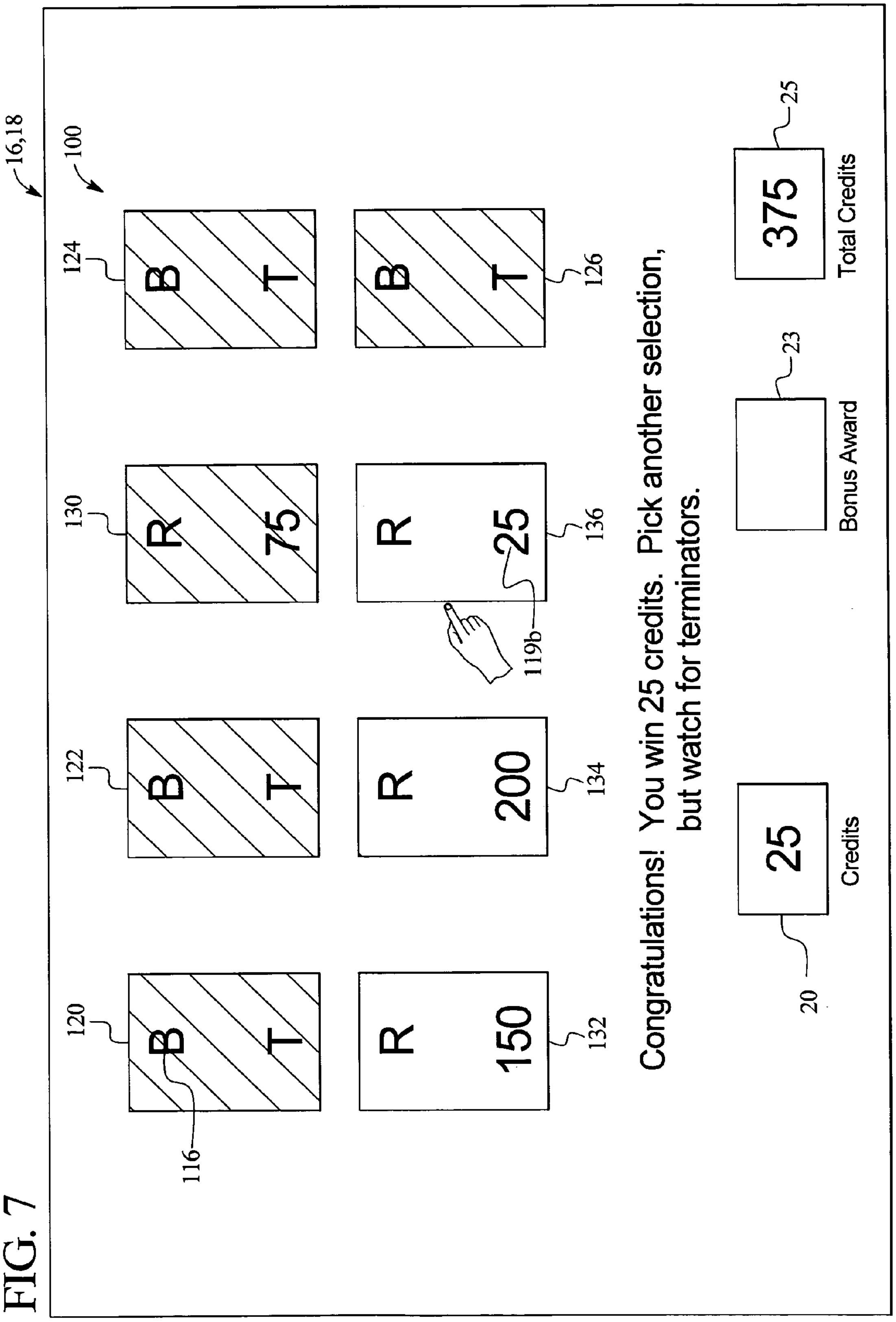
FIG. 7 is a front perspective view of a display device illustrating a selection game of one embodiment of the present invention.

Referring now to FIG. 7, the player picks another element 136 from the "R" group and is provided the award 119*b* of twenty-five credits associated with the element. The award of twenty-five is provided to the player as indicated by the credits display 20 and is added to the award provided to the player in the previous picks for a cumulative total award of three hundred seventy-five credits as indicated in the total credits display 25. Again, the player is prompted to pick another element.

Figure 8A:
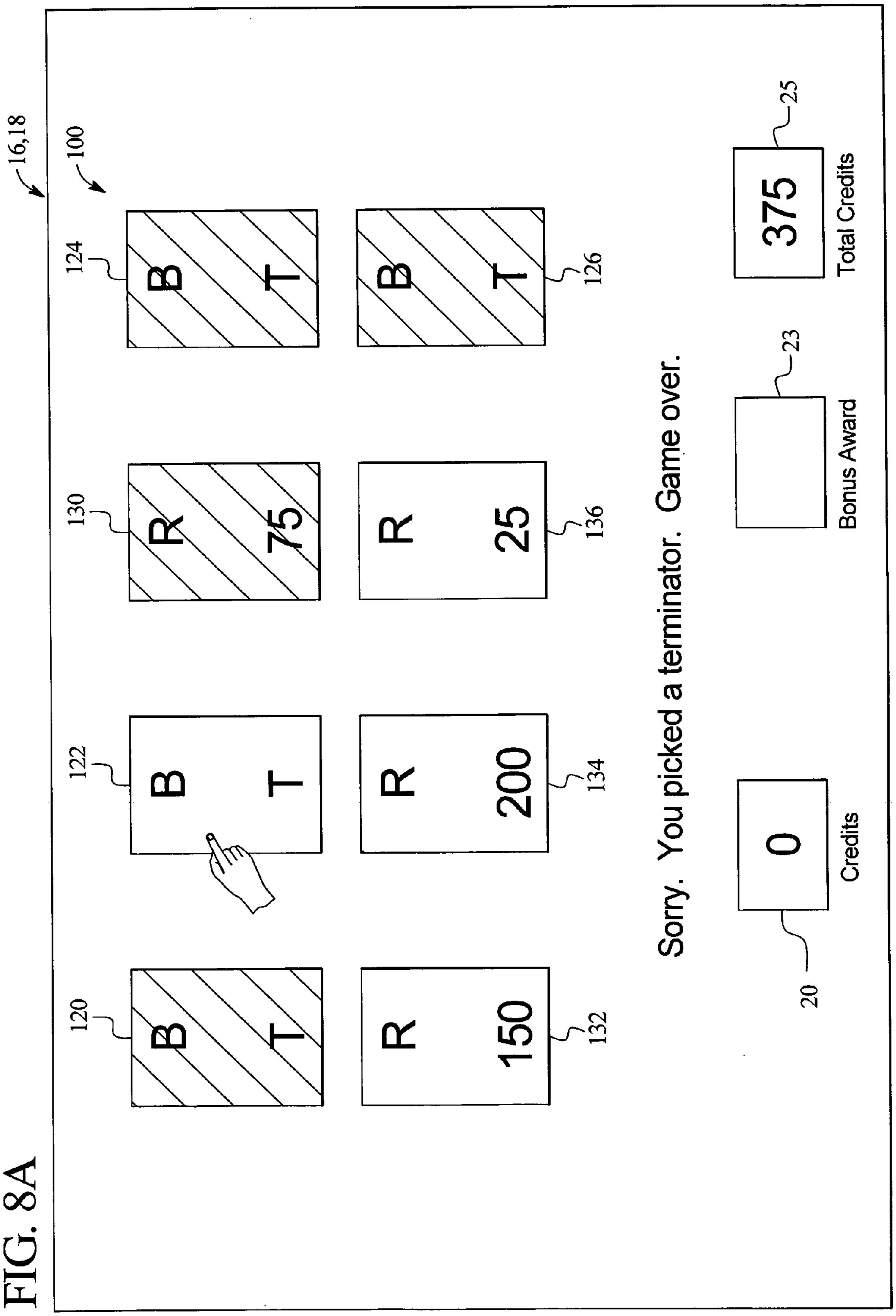
FIGS. 8A, 8B and 8C is a front perspective view of a display device illustrating different outcomes of different embodiments of a selection game of the present invention.

Referring now to FIG. 8A, the player picks an element 122 which has a distributed or associated terminator represented by the "T" symbol. As discussed above, in one embodiment, the player is no longer able to pick any additional elements and is provided the awards accumulated from each of the prior picked elements and the game ends.

Figure 8B:
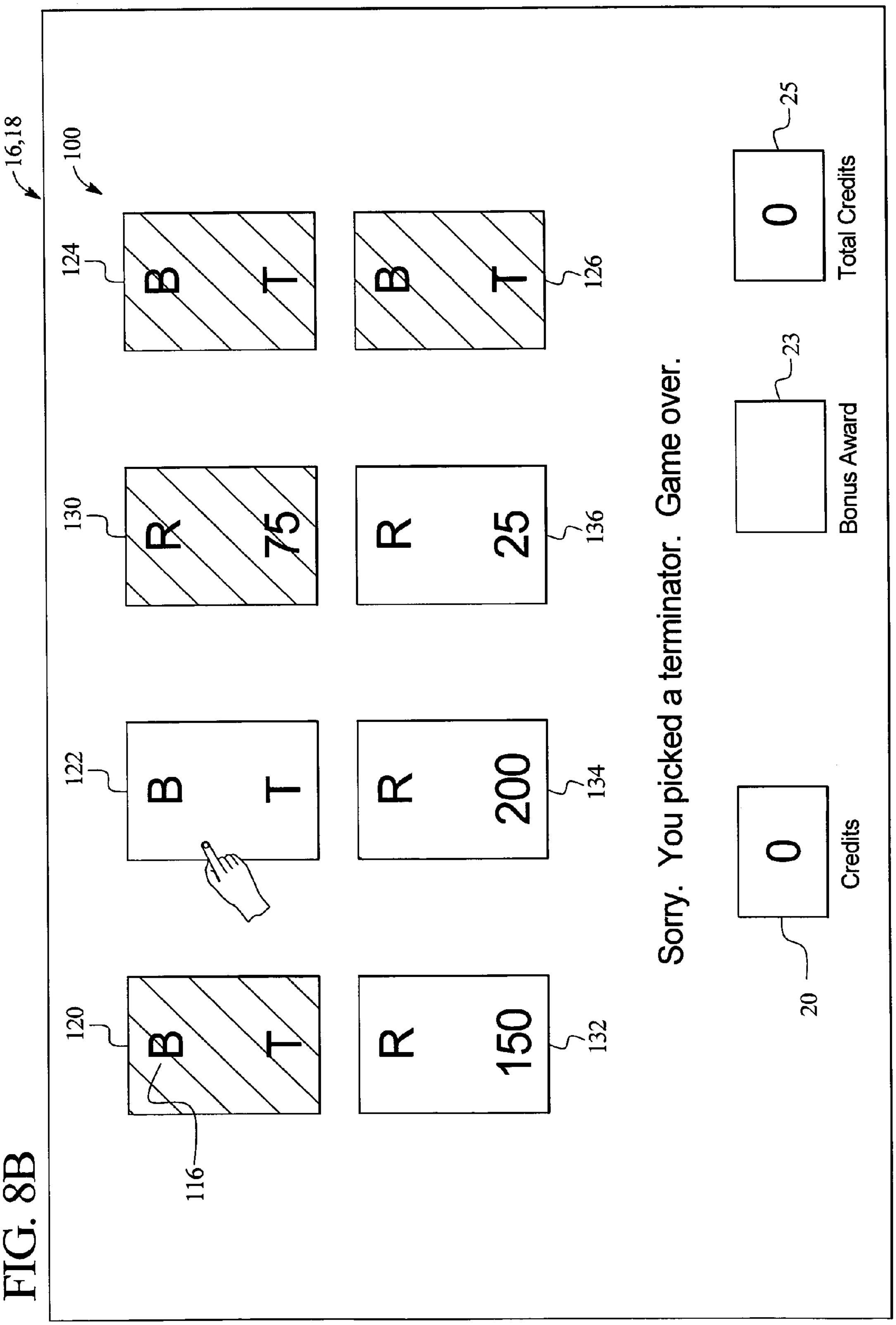

In an alternative embodiment illustrated in FIG. 8B, the gaming device enables the player to determine whether to continue picking elements. In such an embodiment, the player continues to pick elements from the displayed groups of elements and to be provided the awards associated with those picked elements unless the player picks an element associated with a terminator. In such an embodiment, the player is provided less than the accumulated awards associated with previously picked elements if the player picks an element associated with a terminator. Accordingly, in this embodiment, the player is provided a choice to pick or not to pick another element. It should be appreciated that, by picking another element, the player may be provided an additional award if an award is associated with the next picked element, but risks losing some or all of the accumulated awards if a terminator is associated with the next picked element. By not picking another element, the player does not risk losing the accumulated awards if a terminator is associated with the next picked element, but foregoes any additional award that may be associated with the next picked element. In the embodiment illustrated in FIG. 8B, the player loses all accumulated awards because the player chooses to pick another element, and the picked element is associated with a terminator.

Figure 8C:
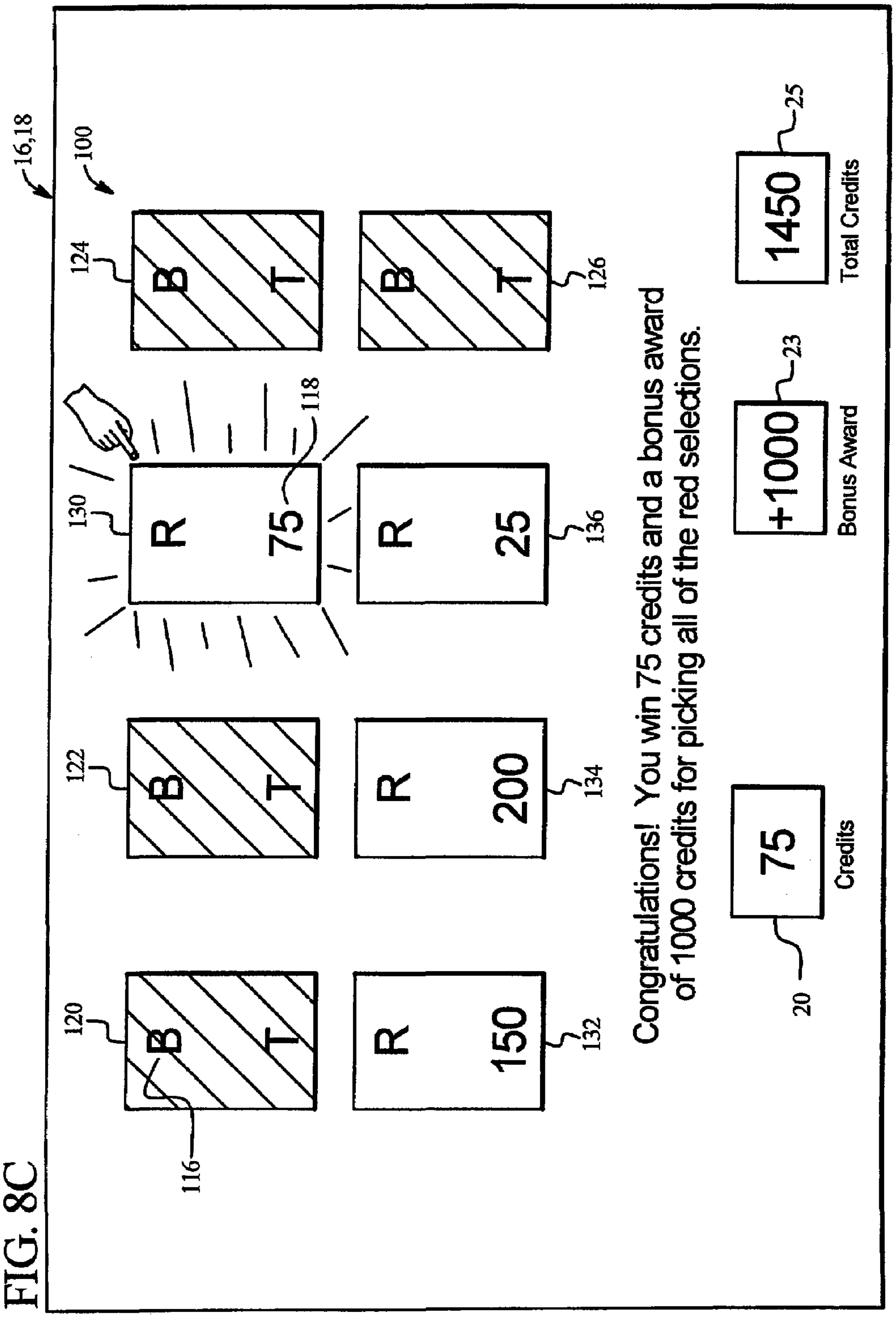

In one embodiment, if the player picks all of the elements of at least one element group wherein the picked element is not associated with a terminator, the player is provided an additional or bonus award. FIG. 8C illustrates the game play continued from FIG. 7. In FIG. 8C, the player picks the last element 130 of the "R" group of elements 130, 132, 134, and 136. It should be appreciated that the display can indicate to the player the successful pick of the last element of a group by any suitable audio or visual indication such as highlighting the last picked element or indicating all of the picked elements of the group. In FIG. 8C, the player not only receives the award 118 of seventy-five credits associated with the element 130, but also receives a bonus award of one thousand credits as indicated by the bonus award display 23. Therefore, the player is provided an award of one thousand four-hundred fifty credits as indicated by the total award display 25.

Figure 9:
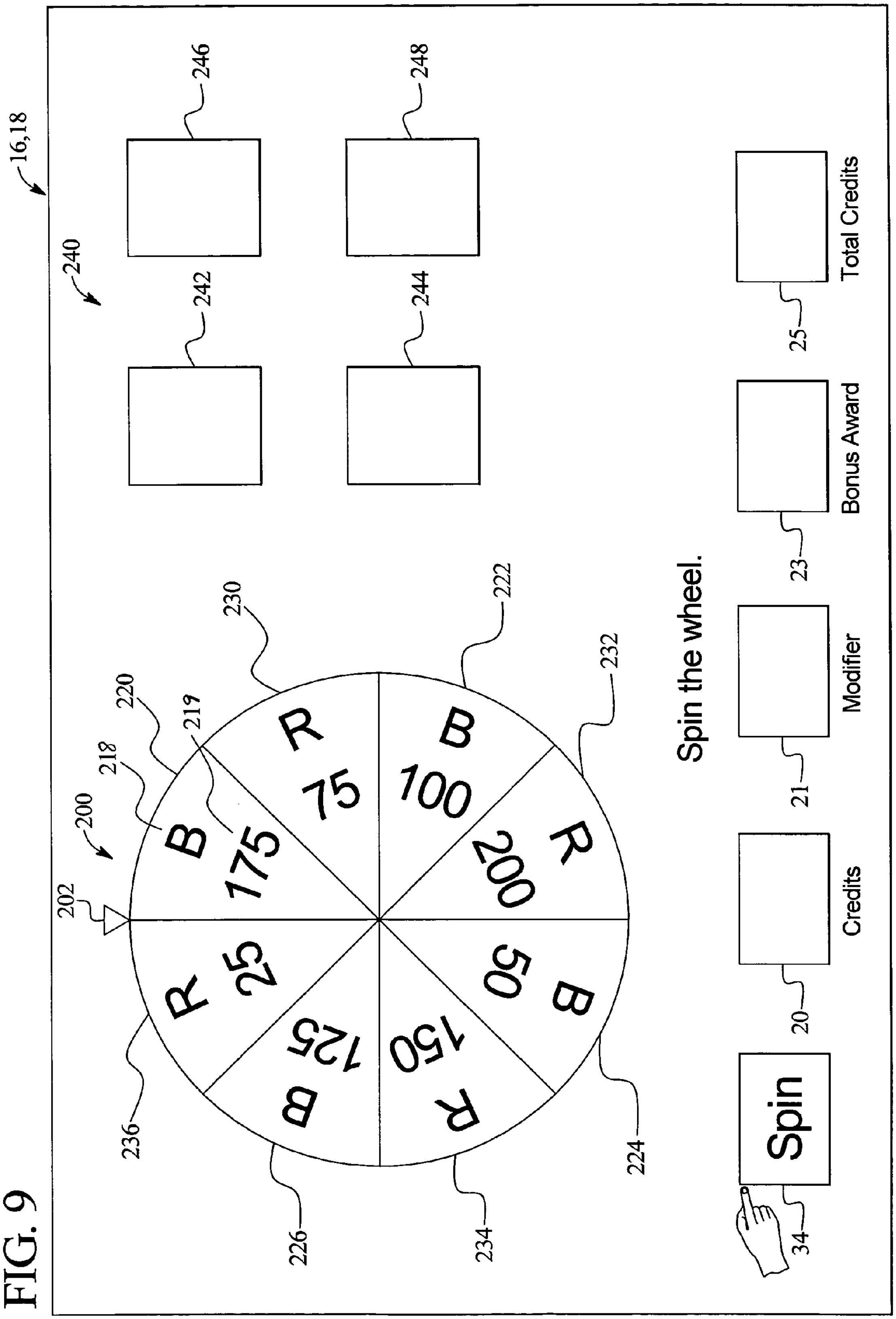
FIG. 9 is a front perspective view of a display device illustrating a wheel display device and a selection game of one embodiment of the present invention.

Referring now to FIGS. 9 to 17, in one embodiment of the present invention, a terminator is associated with a plurality of sections or elements of a display device based on the occurrence of an event in the game. In the embodiment illustrated in FIGS. 9 to 17, the display device includes a wheel 200 and a plurality of selections 240. The wheel 200 is divided, in one embodiment, into two groups of sections or elements. It should be appreciated that the wheel can be divided into any suitable number of groups of sections or elements. In one embodiment, the gaming device indicates a section. Accordingly, an indicator 202 is operable to indicate one of the sections upon activation of the wheel. In one embodiment, each group of sections includes a plurality of sections. In FIG. 9, two groups of four sections or elements, and thus eight total sections, are displayed to the player on the wheel display device 200. Although the groups illustrated in FIG. 9 include the same number of sections in each group, it should be appreciated that at least one of the groups can include a different number of sections in that group.

Each section includes a group designation 218 and an award value 219 associated with each section. The "B" group of sections 220, 222, 224, and 226 are distinguished from the "R" group of sections 230, 232, 234 and 236. It should be appreciated that any symbol, color, suit or other suitable perceptible indicia can be used to distinguish each of the sections from the sections of another group of sections.

In one embodiment, an award 219 is associated with each section. In one embodiment, the expected average values of the awards associated with the different groups are equal or approximately equal. As indicated above, a game designer may implement the present invention in any other suitable manner.

In the illustrated embodiment, a selection set including a plurality of masked selections, is also displayed to the player. It should be appreciated that the selection set can include any suitable number of selections. In one embodiment, the number of selections in the selection set is based on a previous outcome of a game or portion of a game. The selection set, in one embodiment, is displayed simultaneously with the display device 200 described above. In one embodiment, the selection set appears in the same display 16 or 18 as the display device 200. Alternatively, the selection set is displayed in a different display and/or at a different time. In one embodiment, the gaming device enables the player to activate the wheel display until a displayed selection associated with a terminator is indicated by the display device or all of the selections in the selection set have been picked by the player, whichever comes first.

In FIG. 9, the selection set 240 includes four masked selections 242, 244, 246 and 248 simultaneously displayed with the wheel display 200. In one embodiment, an outcome such as a modifier is associated with each selection. In one embodiment, the modifier modifies the award associated with an indicated section or element. It should be appreciated that the modifier can include a factor having a positive effect on a game outcome such as a multiplier, additional credits, or any other positive factor. Alternatively, or in addition, the modifier can include a factor having a negative effect on the game outcome.

Figure 10:
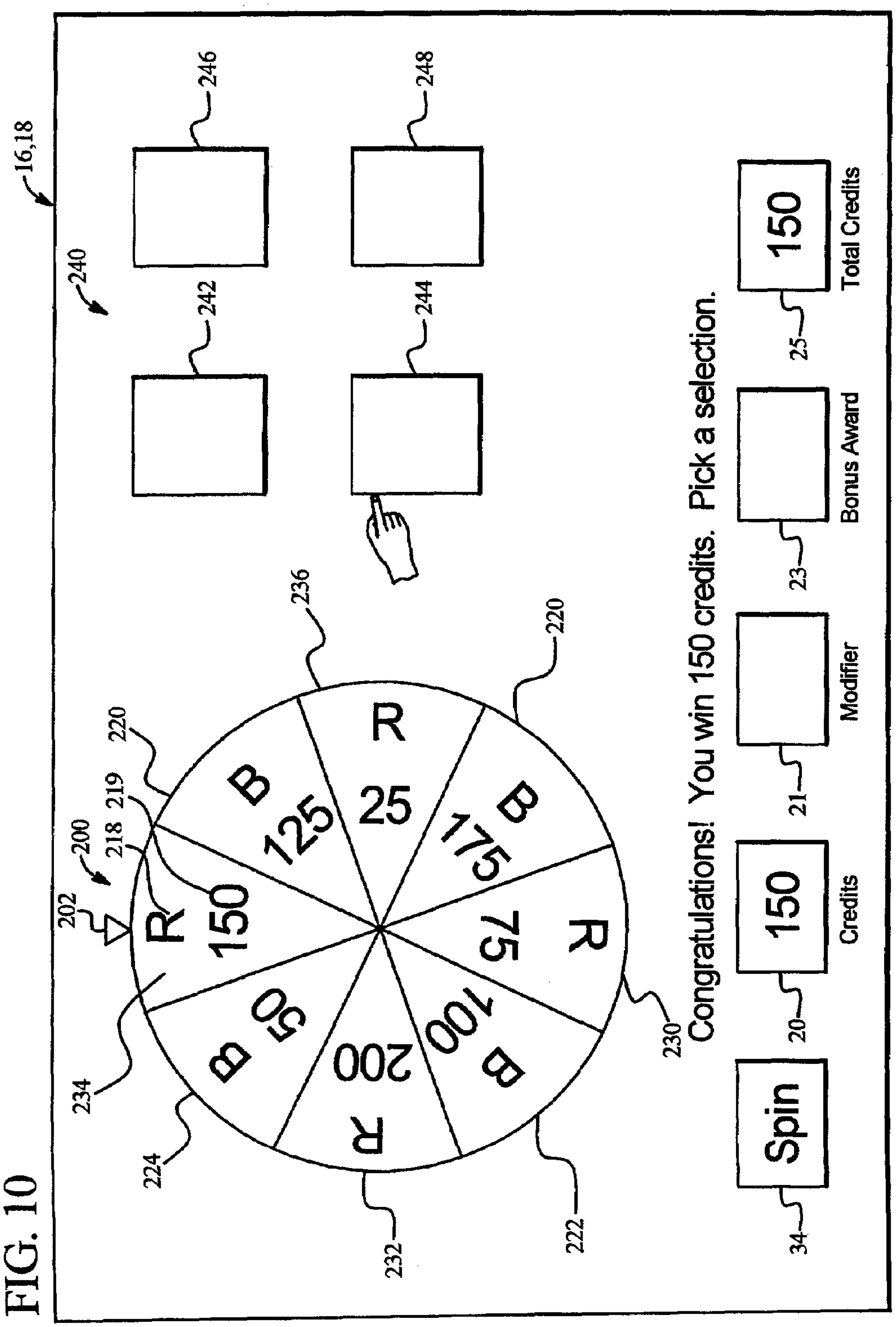
FIG. 10 is a front perspective view of a display device illustrating a wheel display device and a selection game of one embodiment of the present invention.

In FIG. 9, the player is prompted to spin or activate the wheel to cause the gaming machine to randomly determine one of the sections to be indicated on the display device. The result of the activation of the wheel display in FIG. 9 is illustrated in FIG. 10. As illustrated in FIG. 10, the indicator 202 indicates section 234 on the wheel display 200. Section 234 is one of the plurality of sections in the "R" group of sections as indicated by the "R" symbol 218 on the section. In addition, the player is provided an award 219 of one hundred fifty credits associated with the indicated section 234 as indicated by the credits display 20 and the total credits display 25. It should be appreciated that the awards can be predetermined and associated before a section or element is indicated.

Figure 11:
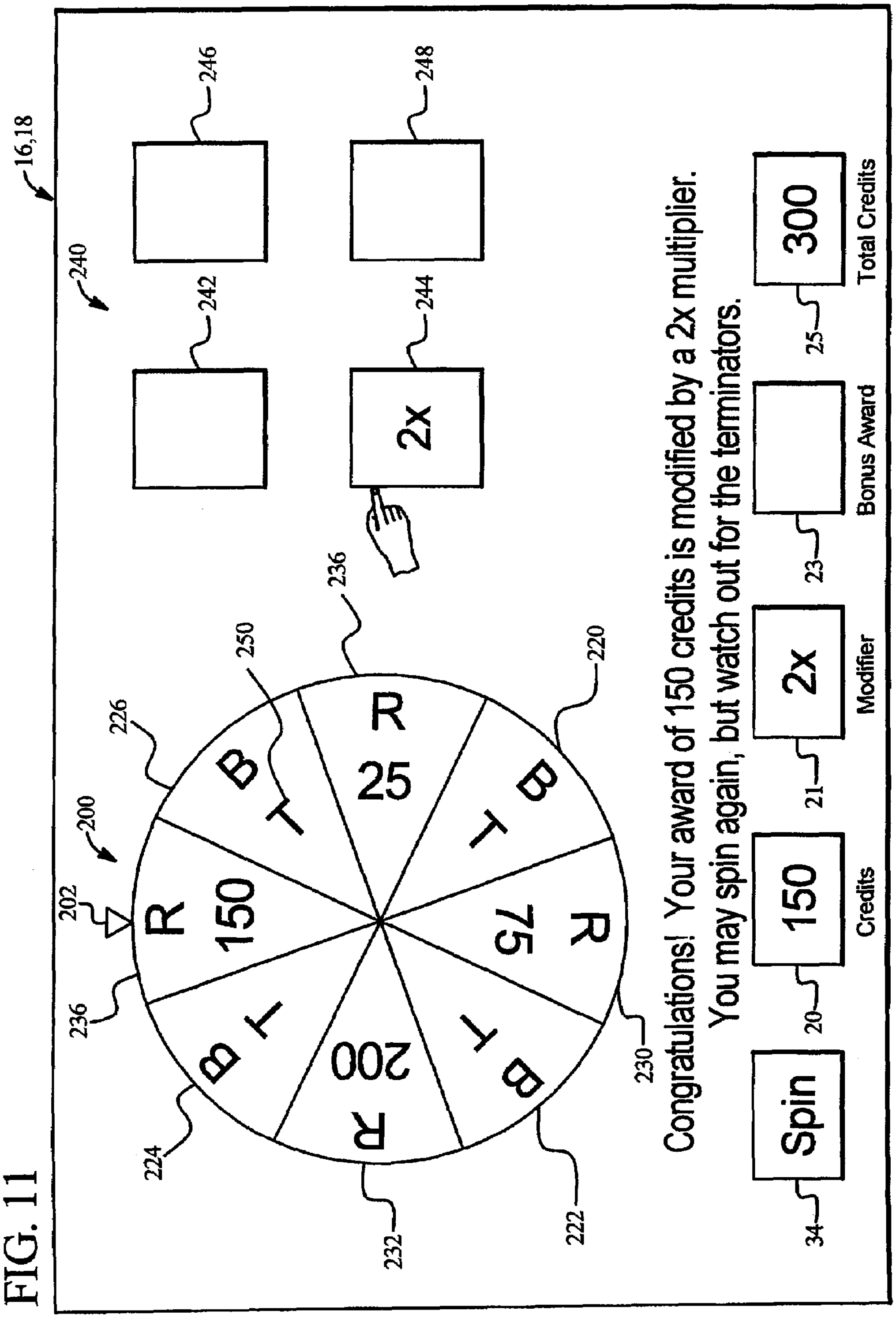
FIG. 11 is a front perspective view of a display device illustrating a wheel display device and a selection game of one embodiment of the present invention.

In one embodiment of the present invention, the player is prompted to pick one of the selections in the selection set upon being provided an award associated with an indicated section. Accordingly, in FIG. 10, the player is prompted to pick one of the selections in the selection set 240. The player picks selection 244 which reveals a 2× multiplier. In one embodiment, the modifier is applied to the award associated with the most recent indicated section. Alternatively, the modifier is applied to the cumulative amount of at least one of the awards associated with indicated sections. In FIG. 11, the modifier is applied to the award of one-hundred fifty credits to produce a total award of three hundred credits (i.e., 150 credits×2) as indicated by the total credits display 205. In one embodiment, once the player has picked a selection from the selection set, the selection is no longer available to be picked by the player. Accordingly, in this embodiment, the gaming device indicates that the selection picked by the player is eliminated from the set of selections to be picked by the player.

In FIG. 11, after at least one activation and initial indication of at least one section, one embodiment of the present invention includes distributing or associating a terminator with a plurality of the sections or elements. In one embodiment, the terminators are associated with the sections of one group or more than one group of sections not indicated by the display device. In an alternative embodiment, terminators are associated with a plurality of sections from the group of sections indicated by the display device. In one embodiment, the terminators replace the awards associated with the non-indicated groups of sections or elements. Alternatively, the awards remain associated with the non-indicated groups of sections or elements although terminators are associated with the elements. In FIG. 11, the display device indicates one of the sections 236 from the "R" group. A terminator 250 is then associated with each of the sections 220, 222, 224, and 226 from the other group of sections or the "B" group of sections.

In FIG. 11, the gaming device prompts the player to activate the wheel display 200 to indicate another section. In one embodiment, the gaming device continues to enable the player to activate the wheel display to indicate sections and to provide the awards associated with the indicated sections until the display device indicates a section associated with a terminator. In an alternative embodiment, the gaming device continues to enable the player to activate the wheel display to indicate sections from the displayed groups of sections. In addition, the gaming device provides to the player awards associated with those indicated sections unless the display device indicates a section associated with a terminator.

In one embodiment, the terminators replace the awards associated with the non-indicated groups of sections or elements. Alternatively, the awards remain associated with the non-indicated groups of sections or elements although terminators are associated with the elements. In such embodiments of the present invention, the gaming device provides to the player the award associated with the section or element, even if a terminator is associated with that section or element, and the game is subsequently terminated. In one embodiment, even if a terminator is associated with a prior indicated section or element, the game does not end until the gaming device enables the player to pick any remaining selections. In such an embodiment, the award associated with the indicated section or element is modified by any modifier associated with the player-picked selection, and the game ends.

In one embodiment, the player is provided a choice of whether to activate or not to activate the wheel display. In such embodiment, the player is provided less than the accumulated awards associated with previously indicated sections if the display device indicates a section associated with a terminator. It should be appreciated that if a player activates the wheel display, the player may be provided an additional award if an award is associated with the next indicated section, but the player risks losing some or all of the accumulated awards if a terminator is associated with the next indicated section. In contrast, if the player decides not to activate the wheel, the player does not risk losing the accumulated awards if a terminator is associated with the next indicated section, but foregoes any additional award that may be associated with the next indicated section.

Figure 12:
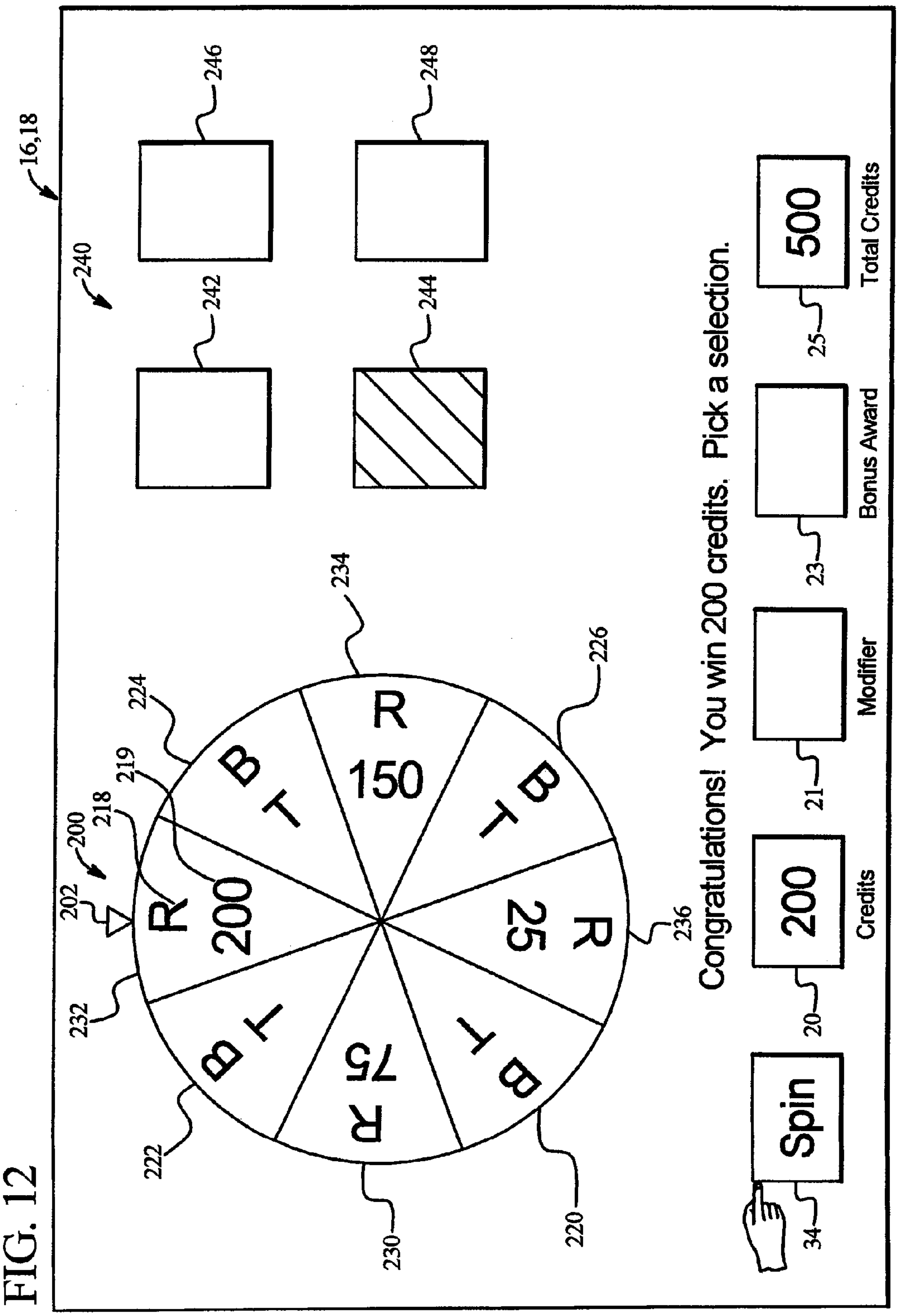
FIG. 12 is a front perspective view of a display device illustrating a wheel display device and a selection game of one embodiment of the present invention.

Referring to FIG. 12, the display device indicates another section 232 from the "R" group 218 having an award 219 associated therewith. The award of two hundred credits is provided to the player as indicated by the credits display 20 and is added to the modified award provided to the player in the previous wheel display activation and pick of the selections for a cumulative total award of five hundred credits as indicated in the total credits display 25.

Figure 13:
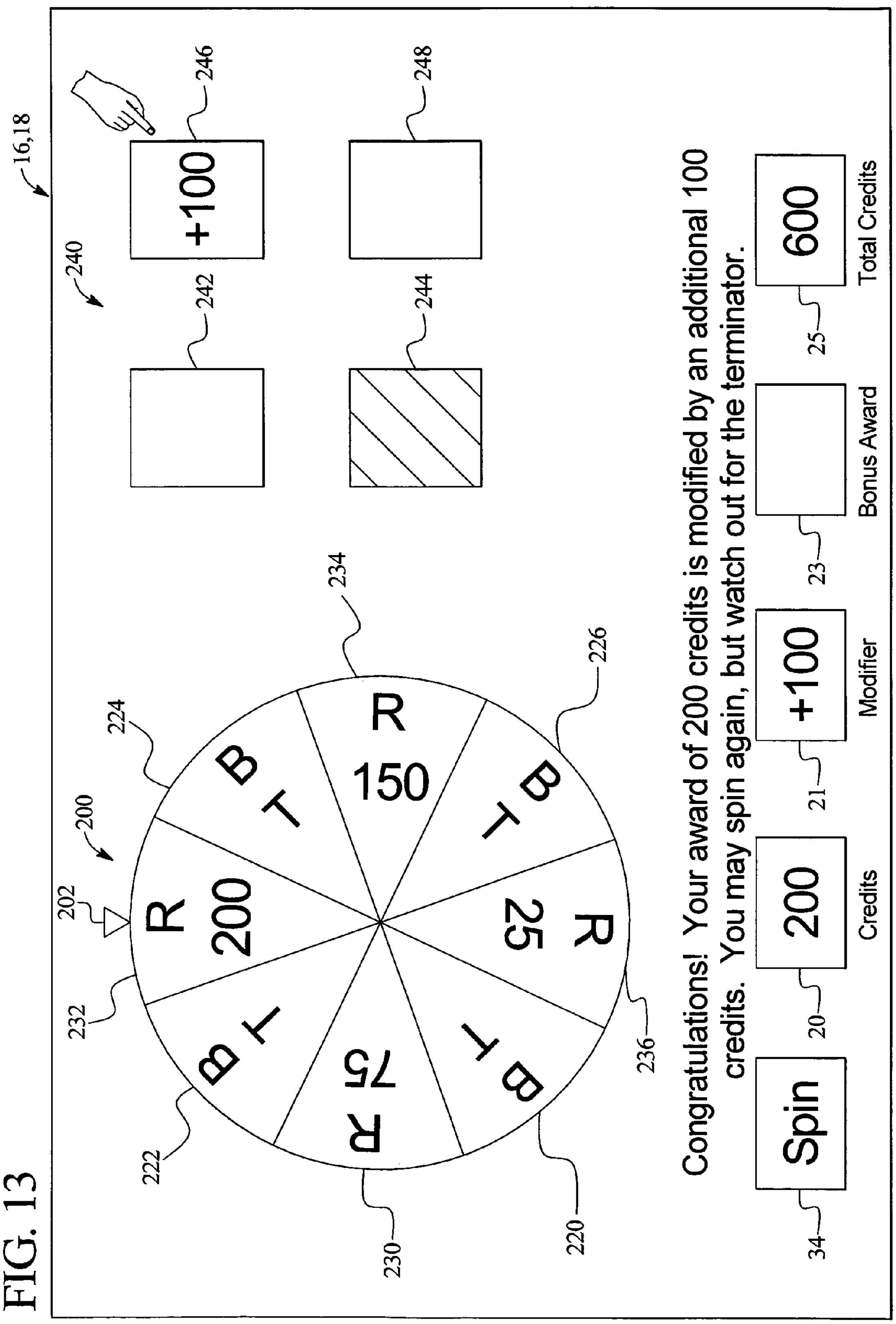
FIG. 13 is a front perspective view of a display device illustrating a wheel display device and a selection game of one embodiment of the present invention.

In one embodiment, the gaming device enables the player to activate the wheel display until a displayed selection associated with a terminator is indicated by the display device or all of the selections in the selection set have been picked by the player, whichever comes first. Accordingly, in FIG. 13, the selection 244 picked in the activation of the display device is inactivated and is not available to be selected by the player, Therefore, the gaming device enables the player to pick one of selections 242, 246 and 248 of the set of displayed selections 240. In FIG. 13, the player picks selection 246 of the set of selections 240. A modifier of an additional one hundred credits is associated with the picked selection. The one hundred credits is indicated by the modifier display 21 and is added to the award associated with the indicated section of the wheel display to provide a total of six hundred credits (i.e., 300 previous total credits+200 credits associated with indicated section+100 credit modifier) as indicated by the total credits display 25.

Figure 14:
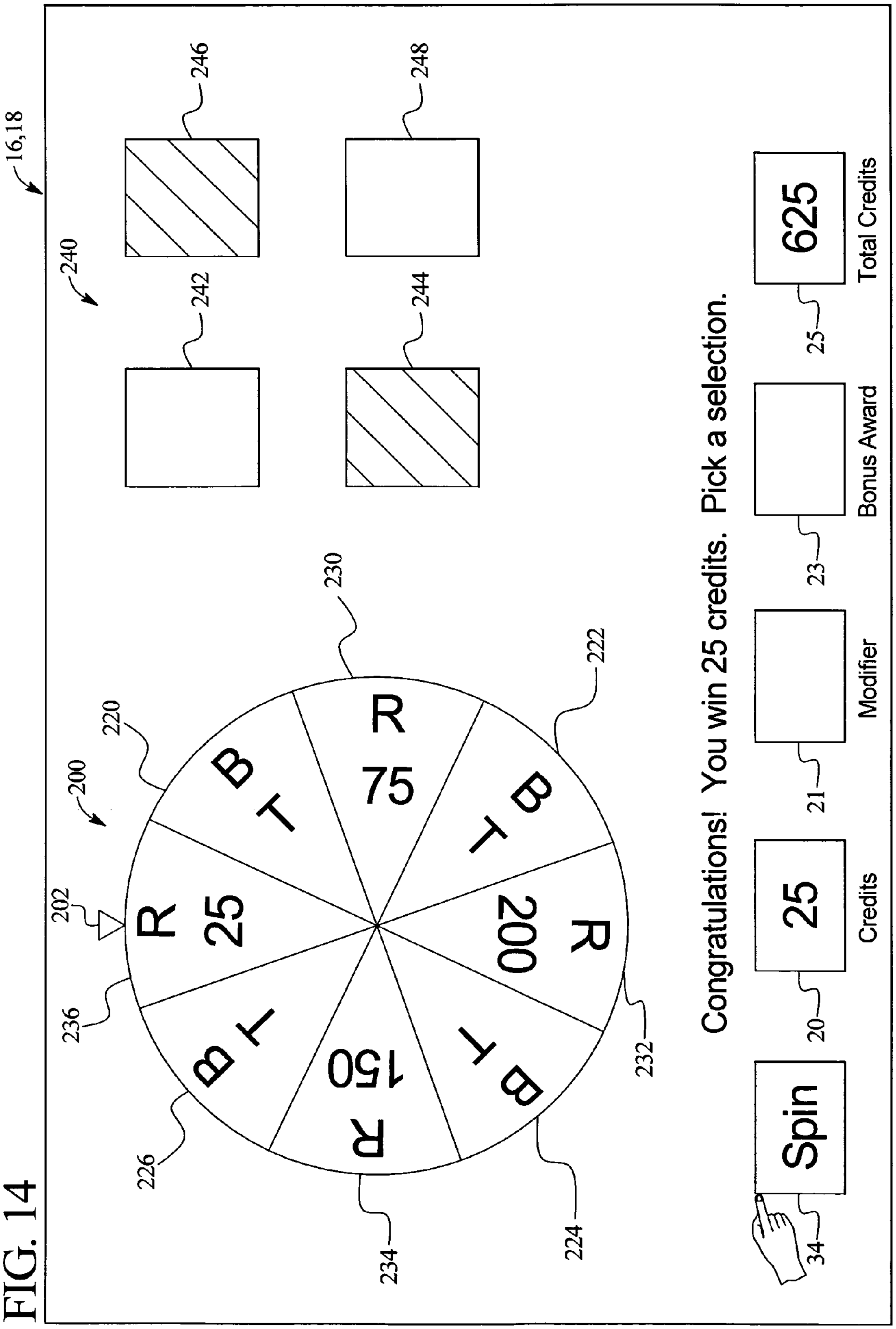
FIG. 14 is a front perspective view of a display device illustrating a wheel display device and a selection game of one embodiment of the present invention.
Figure 15:
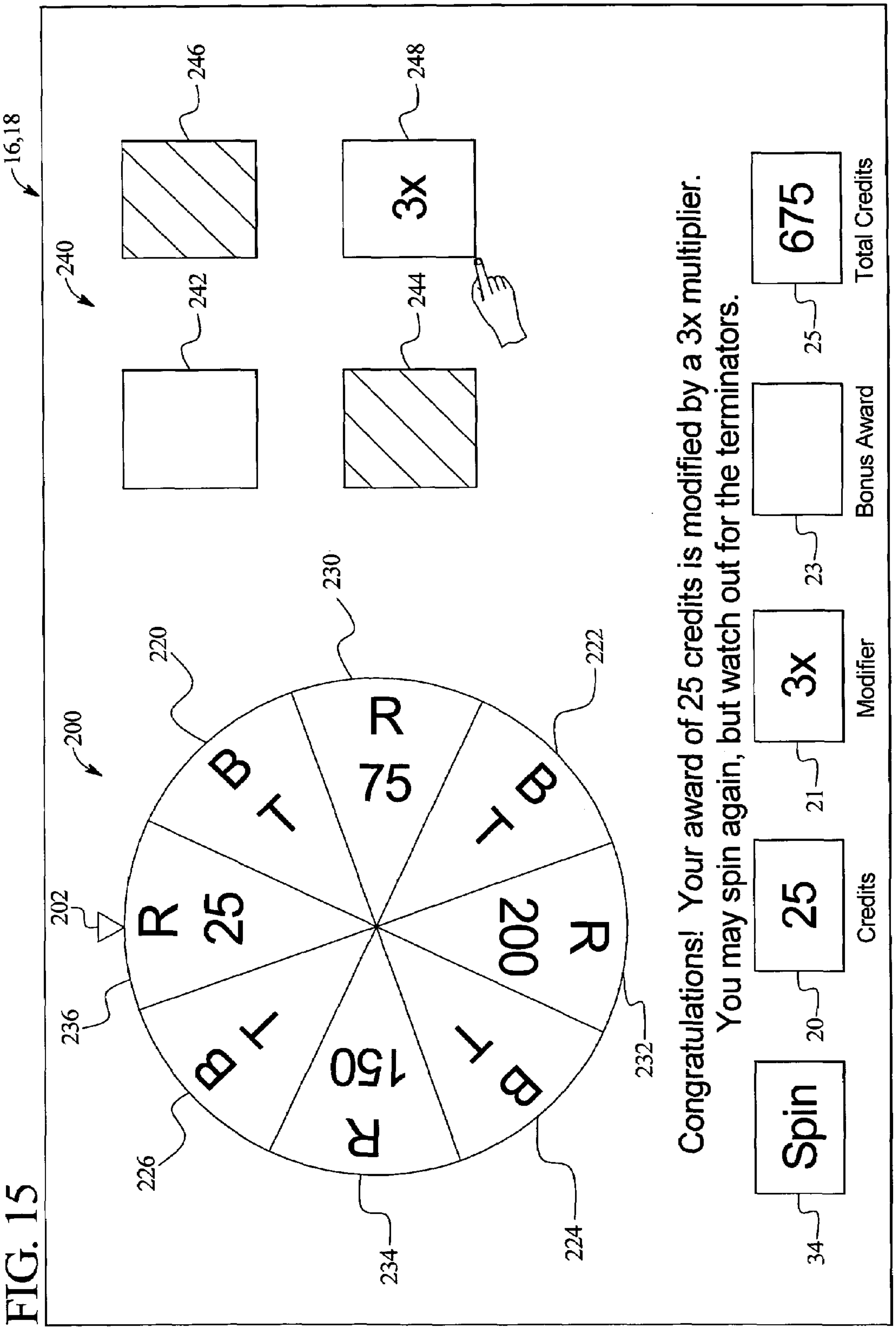
FIG. 15 is a front perspective view of a display device illustrating a wheel display device and a selection game of one embodiment of the present invention.

The gaming device then enables the player to activate the wheel display to indicate another section. In FIG. 14, the display device indicates another section 236 from the red group of sections, and the player is provided the award of twenty-five credits associated with the indicated section 236. Because a terminator is not associated with the indicated selection, the player is prompted to pick any remaining selection of the set of selections 240. In FIG. 14, selections 242 and 248 remain to be picked in the displayed set of selections 240. FIG. 15 illustrates that the player picks selection 248 which reveals a modifier of a 3× multiplier. The 3× multiplier is applied to the award of twenty-five credits associated with the indicated section 236 to produce an award of seventy-five credits. The seventy-five credits is added to the six-hundred credits for a cumulative total award of six hundred seventy-five credits (600+(25×3)) as indicated in the total credits display 25. Again the player is prompted to activated the wheel display to indicate another section.

Figure 16A:
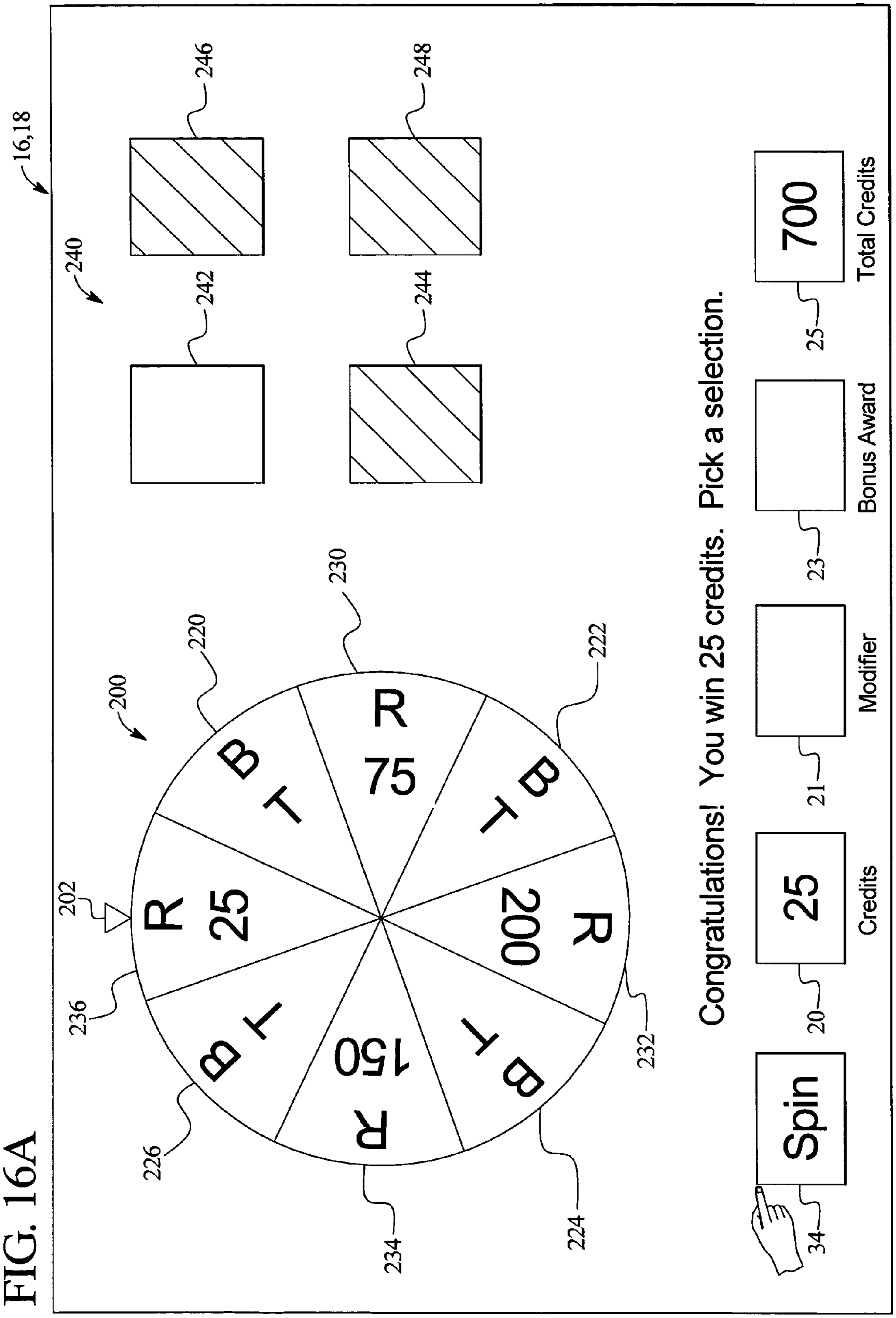
FIGS. 16A, 16B and 16C are front perspective views of a wheel display device and a selection game illustrating different outcomes of different embodiments of the present invention.
Figure 16B:
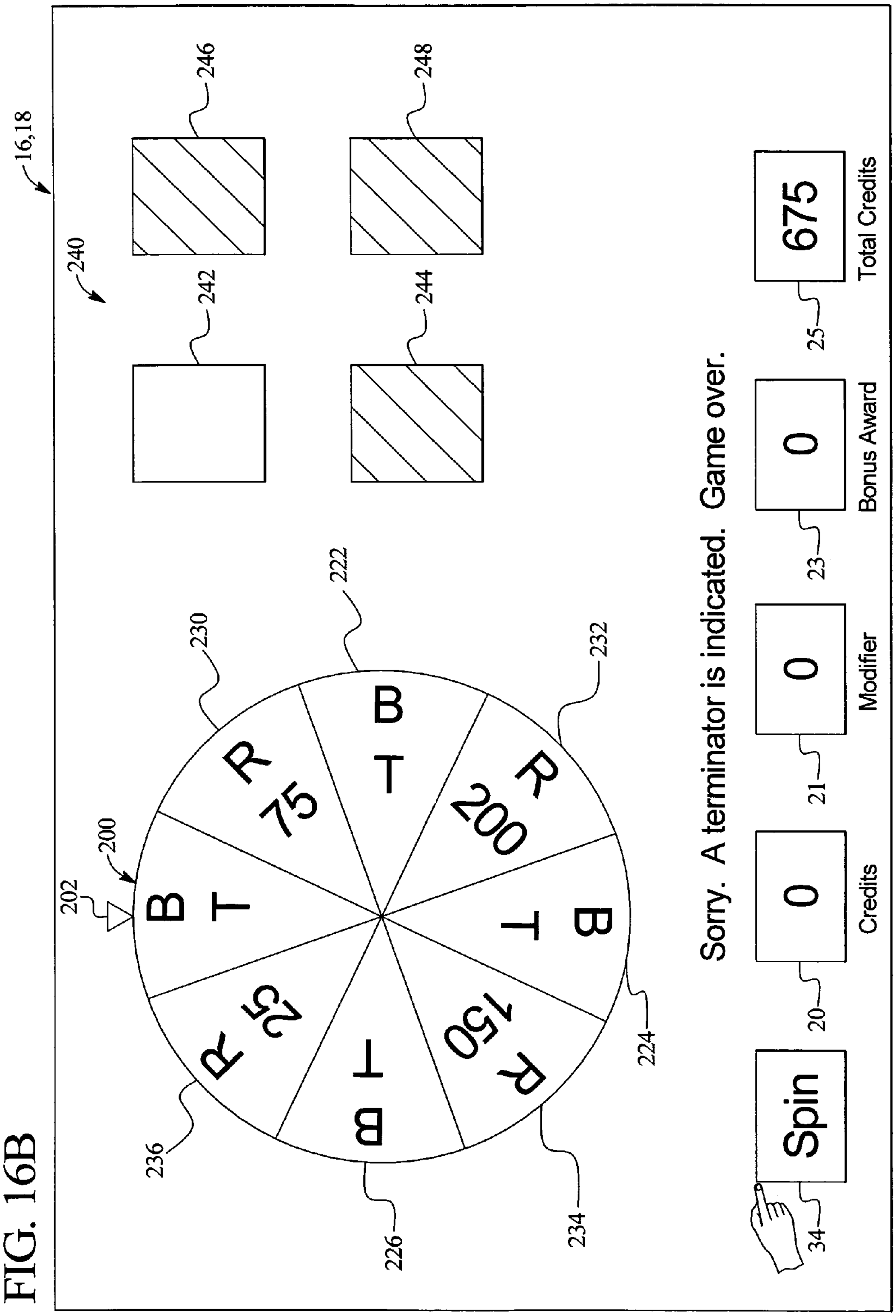
Figure 16C:
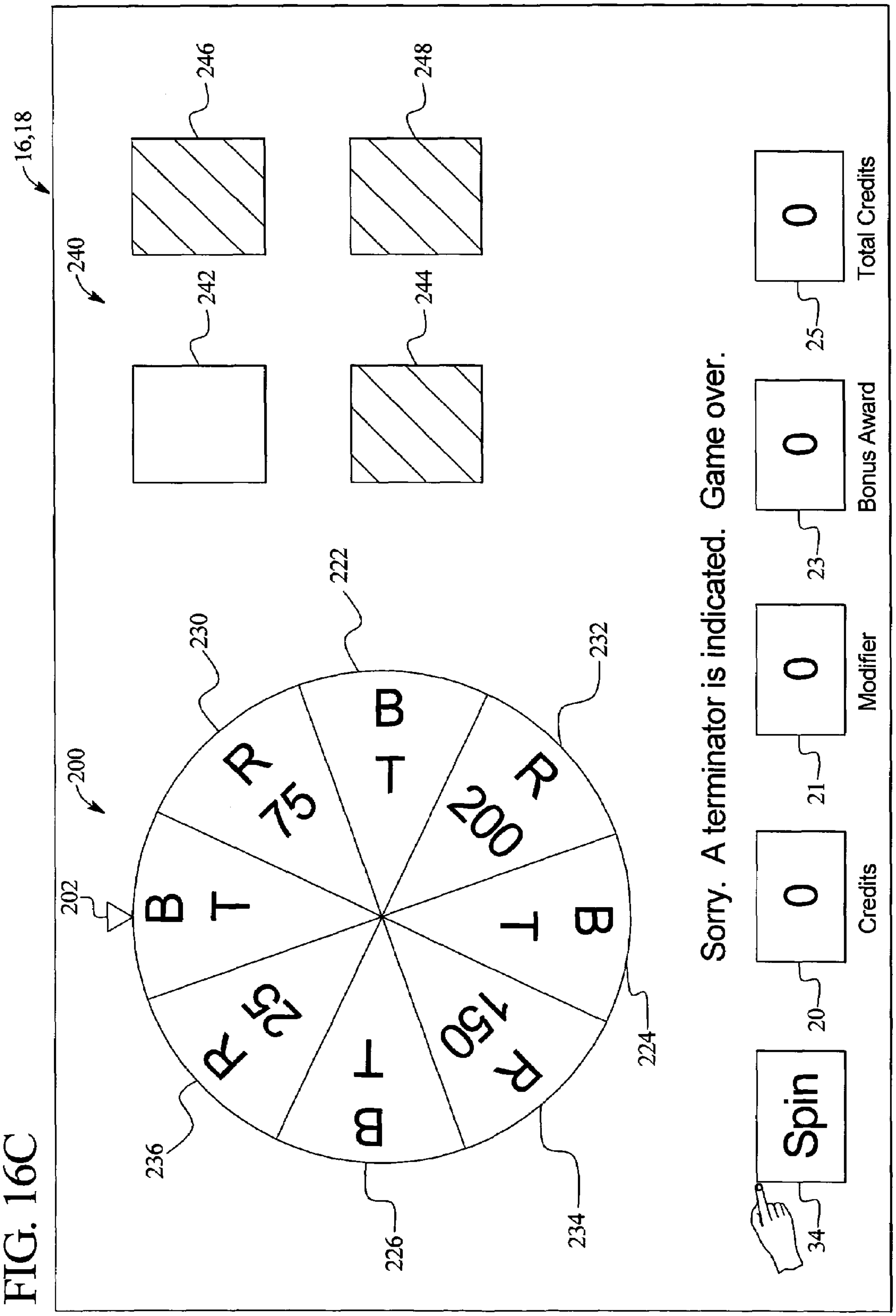

FIGS. 16A, 16B and 16C illustrate alternative outcomes to the activation of the display device illustrated in FIG. 15. In FIG. 16A, the display device again indicates section 236 from the "R" group of sections, and the player is provided the award of twenty-five credits associated with the indicated section. It should be appreciated that a section can be indicated more than once.

In FIG. 16B the activation of the display device of FIG. 15 results in the indication of a section associated with a terminator. As discussed above, in one embodiment, upon the indication of a section associated with a terminator, the gaming device no longer enables the player to activate the wheel display or pick selections from the set of selections but provides the player the awards accumulated from each of the prior indicated sections modified by the picked selections.

In an alternative embodiment including enabling the player to determine whether to proceed with activating the wheel display to indicate another section, if the display device indicates a section associated with a terminator, the player loses at least part of any awards accumulated from each of the prior indicated sections and any modification of those awards as illustrated in FIG. 16C.

Figure 17:
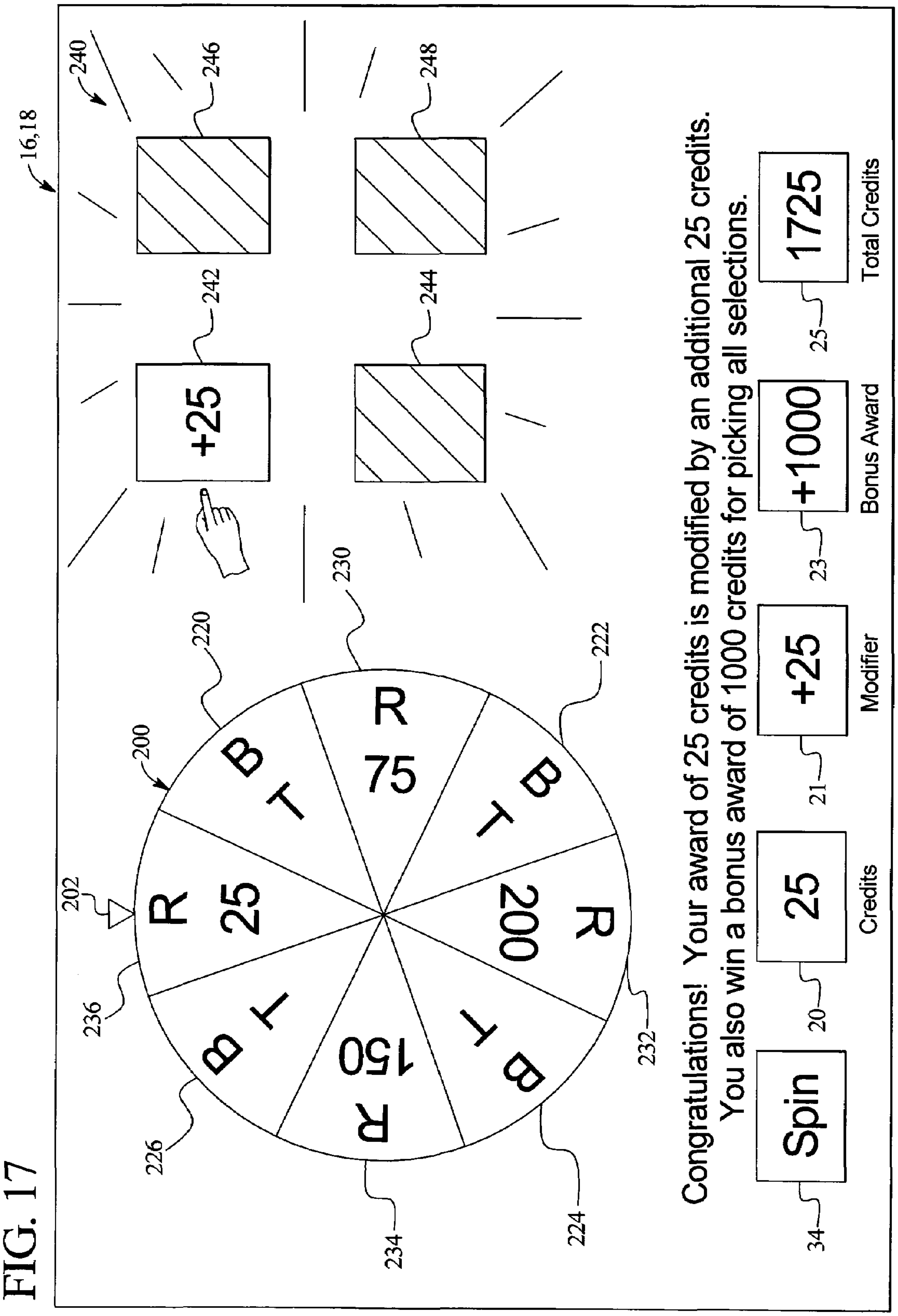
FIG. 17 is a front perspective view of a display device illustrating a wheel display device and a selection game of one embodiment of the present invention.

FIG. 17 is a continuation of the first outcome of the game play illustrated in 16A which includes providing the award associated with the indicated section to the player. It is determined that at least one selection of the set of selections remains to be picked; therefore, the player is prompted to pick a selection. In one embodiment, because there is only one selection remaining, the gaming device automatically reveals the modifier associated with the last remaining selection after the section is indicated. The gaming device reveals the modifier of twenty-five additional credits associated with the remaining selection 242 of the set of selections 240. It should be appreciated that the display device can indicate to the player the successful pick of the last selection of the selection set by any suitable audio, visual or perceptible indication such as highlighting the last picked selection or all of the picked selections. In FIG. 17, the gaming device of the present invention provides the player the modified award associated with the section 236 and the picked selection 242 of fifty credits as indicated by the credits display 20 and modifier display 21, respectively.

In one embodiment, if all of the selections in the selection set are picked before a section on the display wheel associated with a terminator is indicated, the gaming device provides the player a bonus award. For example, in FIG. 17, the player is provided one thousand credits as indicated by the bonus award display 23 in FIG. 17. Therefore, the player is provided an accumulated award of one thousand seven hundred twenty-five credits as indicated by the total award display 25.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device comprising:

at least one input device;

at least one display device;

at least one processor; and at least one memory device storing a plurality of instructions which, when executed by the at least one processor, cause the at least one processor to operate with the at least one input device and the at least one display device to:

(a) simultaneously and initially display each element of each of a plurality of groups of elements, wherein each group includes a plurality of elements and none of the plurality of initially displayed elements in each group of elements are associated with a terminator;

(b) cause at least one element of one of the groups of elements to be picked;

(c) after the at least one element is picked, associate a terminator with each of a plurality of elements of at least one of the groups of elements which does not include the at least one picked element;

(d) provide a player any award associated with the picked element;

(e) after the terminator has been associated with each of the plurality of elements of the at least one group of elements which does not include the at least one picked element, cause at least one element of one of the groups of elements to be subsequently picked;

(f) provide the player any award associated with each subsequently picked element; and (g) terminate the game if the element caused to be picked is associated with one of the terminators.

2. The gaming device of claim 1, which includes a plurality of awards, wherein each award is associated with one of a plurality of the elements.

3. The gaming device of claim 1, wherein the plurality of instructions, when executed by the at least one processor, cause the at least one processor to operate with the at least one input device and the at least one display device to associate an award with each element.

4. The gaming device of claim 1, wherein the plurality of instructions, when executed by the at least one processor, cause the at least one processor to operate with the at least one input device and the at least one display device to enable the player to select the elements.

5. The gaming device of claim 1, wherein the plurality of instructions, when executed by the at least one processor, cause the at least one processor to operate with the at least one input device and the at least one display device to enable each element to be picked only once.

6. The gaming device of claim 1, wherein the plurality of instructions, when executed by the at least one processor, cause the at least one processor to operate with the at least one display device to indicate the picked element.

7. The gaming device of claim 1, wherein the at least one display device includes a wheel.

8. The gaming device of claim 1, wherein the plurality of instructions, when executed by the at least one processor, cause the at least one processor to operate with the at least one input device and the at least one display device to enable the player to determine whether an element is subsequently picked.

9. The gaming device of claim 8, wherein the plurality of instructions, when executed by the at least one processor, cause the at least one processor to operate with the at least one input device and the at least one display device to accumulate the award associated with each element until an element associated with one of the terminators is picked and provide the accumulated award to the player unless an element associated with one of the terminators is picked.

10. The gaming device of claim 1, which includes a plurality of selections, wherein the plurality of instructions, when executed by the at least one processor, cause the at least one processor to operate with the at least one input device and the at least one display device to enable the player to pick at least one of said selections if one of the terminators is not associated with one of the picked elements.

11. The gaming device of claim 10, wherein the plurality of instructions, when executed by the at least one processor, cause the at least one processor to operate with the at least one input device and the at least one display device to associate each of the selections with a modifier, wherein the modifier modifies the award associated with the picked element.

12. The gaming device of claim 10, wherein the plurality of instructions, when executed by the at least one processor, cause the at least one processor to operate with the at least one input device and the at least one display device to enable the player to pick each of the selections only once.

13. A gaming device comprising:

at least one input device;

at least one display device;

at least one processor; and at least one memory device storing a plurality of instructions which, when executed by the at least one processor, cause the at least one processor to operate with the at least one input device and the at least one display device to:

(a) simultaneously and initially display each section of each of at least two groups of sections, wherein each group includes a plurality of sections and none of the plurality of initially displayed sections in each of the groups of sections are associated with a terminator;

(b) indicate one of the sections of one of the groups of sections;

(c) after the section is indicated, associate a terminator with each of the sections of at least one of the groups of sections which does not include the indicated section;

(d) accumulate any award associated with said indicated section;

(e) after the terminator has been associated with each of the sections of the at least one group of sections which does not include the indicated section, subsequently indicate one of the sections of one of the groups of sections;

(f) accumulate any award associated with said subsequently indicated section; and (g) repeat (e) to (f) until the subsequently indicated section is associated with one of said terminators.

14. The gaming device of claim 13, which includes a plurality of awards, wherein the plurality of instructions, when executed by the at least one processor, cause the at least one processor to operate with the at least one input device and the at least one display device to associate each award with one of a plurality of the sections.

15. The gaming device of claim 13, wherein the plurality of instructions, when executed by the at least one processor, cause the at least one processor to operate with the at least one input device and the at least one display device to associate an award with each section.

16. The gaming device of claim 13, wherein the at least one display device includes a wheel.

17. The gaming device of claim 13, wherein the plurality of instructions, when executed by the at least on processor, cause the at least one display device to operate with the at least one processor to randomly determine and indicate one of the sections of the display device.

18. The gaming device of claim 13, wherein the plurality of instructions, when executed by the at least one processor, cause the at least one processor to operate with the at least one input device and the at least one display device to enable each section to be indicated more than once.

19. The gaming device of claim 13, wherein the plurality of instructions, when executed by the at least one processor, cause the at least one processor to operate with the at least one display device to associate a terminator with each section of each of the other groups of sections.

20. The gaming device of claim 13, wherein the plurality of instructions, when executed by the at least one processor, cause the at least one processor to operate with the at least one input device and the at least one display device to provide the award associated with an indicated section associated with one of the terminators to the player.

21. The gaming device of claim 13, wherein the plurality of instructions, when executed by the at least one processor, cause the at least one processor to operate with the at least one input device and the at least one display device to enable the player to determine whether a section is subsequently indicated.

22. The gaming device of claim 21, wherein the plurality of instructions, when executed by the at least one processor, cause the at least one processor to operate with the at least one input device and the at least one display device to accumulate the award associated with each section until a section associated with one of the terminators is picked and provide the accumulated award to the player unless an element associated with one of the terminators is picked.

23. The gaming device of claim 13, which includes a plurality of selections, wherein the plurality of instructions, when executed by the at least one processor, cause the at least one processor to operate with the at least one input device and the at least one display device to enable the player to pick at least one of said selections if one of the terminators is not associated with one of the indicated sections.

24. The gaming device of claim 23, wherein the plurality of instructions, when executed by the at least one processor, cause the at least one processor to operate with the at least one input device and the at least one display device to associate each of the selections with a modifier, wherein the modifier modifies the award associated with the indicated section.

25. The gaming device of claim 23, wherein the plurality of instructions, when executed by the at least one processor, cause the at least one processor to operate with the at least one input device and the at least one display device to enable the player to pick each of the selections only once.

26. A gaming device comprising:

at least one input device;

at least one display device;

at least one processor; and at least one memory device storing a plurality of instructions, which when executed by the at least one processor, cause the at least one processor to operate with the at least one input device and the at least one display device to:

(a) simultaneously and initially display each section of each of at least two groups of sections, wherein each of the groups includes a plurality of sections and none of the plurality of initially displayed sections in each of the groups of sections are associated with a terminator;

(b) indicate one of the sections of one of the groups of sections;

(c) after the section is indicated, associate a terminator with each of the sections of one of the groups of sections which does not include the indicated section;

(d) accumulate any award associated with said indicated section;

(e) after the terminator has been associated with each of the sections of the group of sections which does not include the indicated section, subsequently indicate one of the sections of one of the groups of sections;

(f) provide a player any award associated with said indicated section unless the indicated section is associated with one of the terminators; and (g) repeat (e) to (f) until the subsequently indicated section is associated with one of the terminators.

27. A gaming device comprising:

at least one input device;

at least one display device;

at least one processor; and at least one memory device storing a plurality of instructions which, when executed by the at least one processor, cause the at least one processor to operate with the at least one input device and the at least one display device to:

(a) simultaneously and initially display each of the elements of each of a plurality of groups of elements, wherein each group includes a plurality of elements and none of the plurality of initially displayed elements in each group of elements is associated with a terminator;

(b) indicate a first one of the elements;

(c) after the first one of the elements of one of the groups is indicated, associate a terminator of a plurality of terminators with each element of at least one group of elements which does not include the first indicated element;

(d) after the terminator has been associated with each element of the at least one group of elements which does not include the first indicated element, indicate an additional one of the elements;

(e) determine if the additional indicated element is associated with one of the terminators;

(f) if the additional indicated element is associated with one of the terminators:

(i) enable a player to pick one of a plurality of selections;

(ii) modify any award associated with the indicated element according to any modifier associated with the picked selection, wherein a modifier is associated with each of the plurality of selections; and (iii) provide the modified award to the player; and (g) repeat (d) through (f) until the additional indicated element is associated with a terminator or all of the selections are picked by the player.

* * * * *